United States Patent
Konno et al.

(10) Patent No.: US 9,120,304 B2
(45) Date of Patent: Sep. 1, 2015

(54) IMAGE PROCESSING APPARATUS, INKJET PRINTING APPARATUS, AND INKJET PRINTING METHOD

(71) Applicant: CANON KABUSHIKI KAISHA, Tokyo (JP)

(72) Inventors: Yuji Konno, Kawasaki (JP); Takeshi Yazawa, Yokohama (JP); Hinako Ojiro, Wynnewood, PA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 13/874,801

(22) Filed: May 1, 2013

(65) Prior Publication Data

US 2013/0300788 A1 Nov. 14, 2013

(30) Foreign Application Priority Data

May 8, 2012 (JP) .................................. 2012-106989

(51) Int. Cl.
*B41J 2/17* (2006.01)
*B41J 2/045* (2006.01)
*B41J 2/21* (2006.01)
*H04N 1/54* (2006.01)

(52) U.S. Cl.
CPC ............ *B41J 2/04501* (2013.01); *B41J 2/2114* (2013.01); *H04N 1/54* (2013.01)

(58) Field of Classification Search
CPC ...... B41J 2/211; B41J 2/2114; B41J 11/0015; B41M 7/0027; G06K 15/1878
See application file for complete search history.

(56) References Cited

U.S. PATENT DOCUMENTS

| | | |
|---|---|---|
| 6,572,212 B2 | 6/2003 | Konno et al. |
| 6,877,833 B2 | 4/2005 | Teshigawara et al. |
| 7,258,412 B2 | 8/2007 | Maru et al. |
| 7,261,387 B2 | 8/2007 | Nishikori et al. |
| 7,408,676 B2 | 8/2008 | Yazawa et al. |
| 7,862,149 B2 | 1/2011 | Yasutani et al. |
| 8,147,019 B2 | 4/2012 | Fujita et al. |
| 8,287,074 B2 | 10/2012 | Kano et al. |

(Continued)

FOREIGN PATENT DOCUMENTS

| | | |
|---|---|---|
| JP | 4040417 B2 | 1/2008 |
| JP | 4066338 B2 | 3/2008 |

OTHER PUBLICATIONS

Takeshi Yazawa, Makoto Torigoe, Hinako Ojiro, Kei Yoshizawa, U.S. Appl. No. 13/871,481, filed Apr. 26, 2013.

(Continued)

*Primary Examiner* — Geoffrey Mruk
(74) *Attorney, Agent, or Firm* — Fitzpatrick, Cella, Harper & Scinto

(57) ABSTRACT

In a color mode, the image quality improving liquid is set to the same rate of 20% for all input signal values. Meanwhile, in a monochrome mode, the image quality improving liquid is set to a rate of 30% in the highlight region, and the ink rate gradually decreases starting from the intermediate tones and proceeding towards the high-density region. Thus, the optimal printing method and usage rate for image quality improving liquid can be adjusted in accordance with the image quality characteristics of the color mode and the monochrome mode. As a result, it is possible to reduce color change in specular light while maintaining at least a certain level of image clarity in both modes, and thus favorably print both color images and monochrome images.

13 Claims, 26 Drawing Sheets

(56) References Cited

U.S. PATENT DOCUMENTS

| | | |
|---|---|---|
| 2011/0032299 A1* | 2/2011 | Mimura .................... 347/15 |
| 2012/0050362 A1 | 3/2012 | Iritani et al. |
| 2012/0050370 A1 | 3/2012 | Iritani et al. |
| 2012/0218330 A1 | 8/2012 | Fujita et al. |
| 2013/0084439 A1 | 4/2013 | Ojiro et al. |

OTHER PUBLICATIONS

Hinako Ojiro, Takeshi Yazawa, Kei Yoshizawa, Makoto Torigoe, U.S. Appl. No. 13/872,598, filed Apr. 29, 2013.

Hinako Ojiro, Makoto Torigoe, Hiroshi Tajika, Yuji Konno, Takeshi Yazawa, Hiroshi Taira, U.S. Appl. No. 13/886,312, filed May 3, 2013.

* cited by examiner

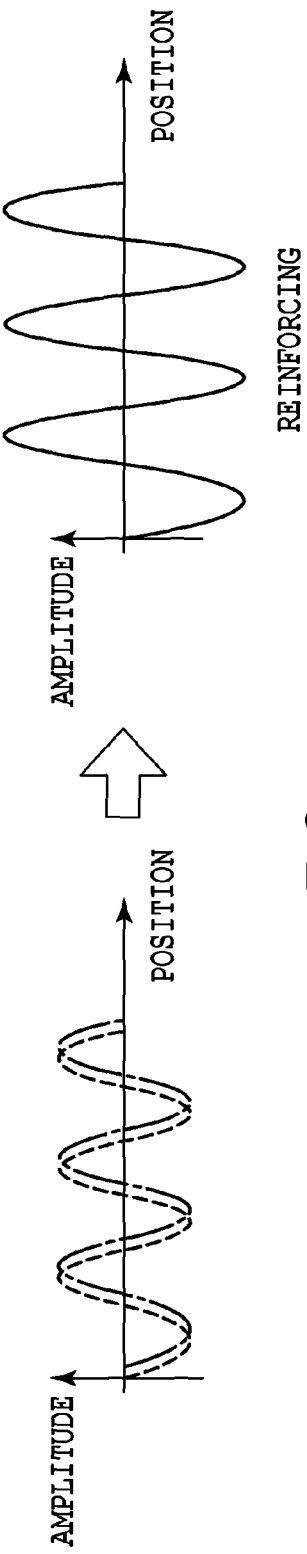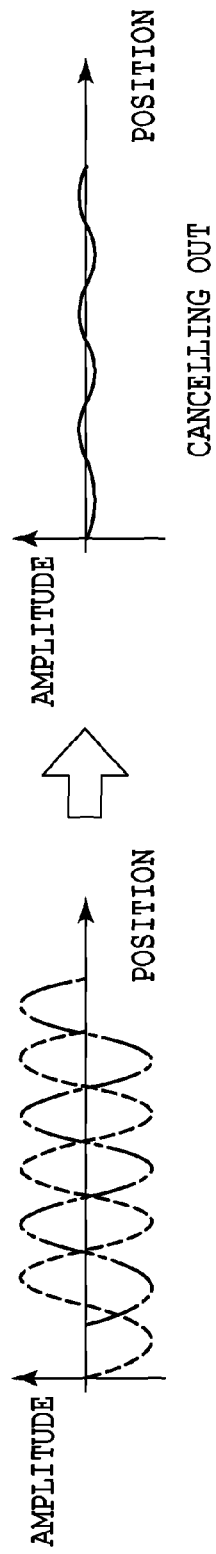

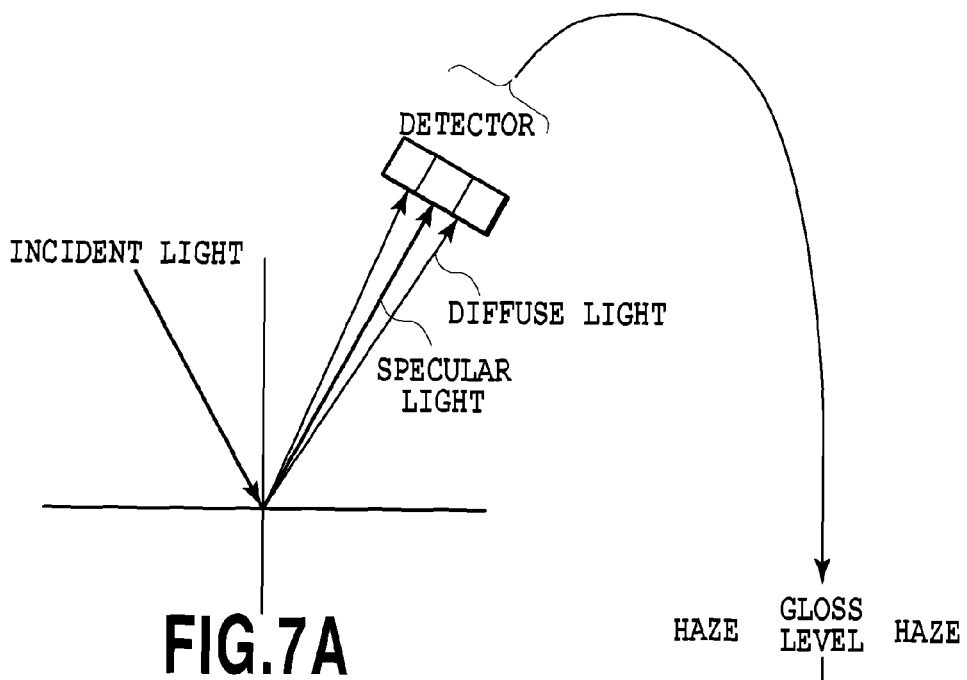
FIG.7A
FIG.7D
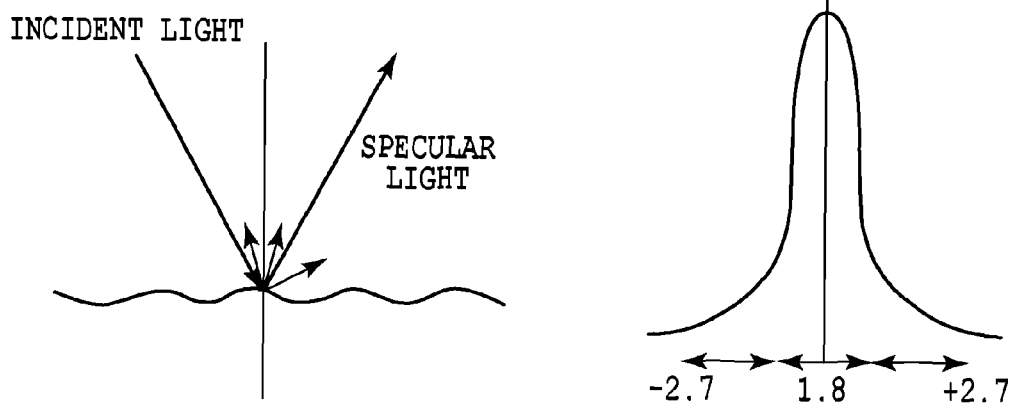
FIG.7B
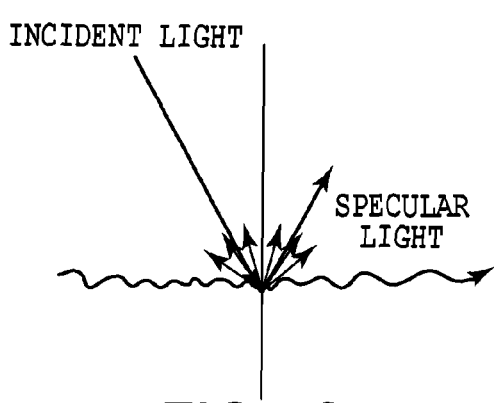
FIG.7C

IMAGE PROCESSING APPARATUS, INKJET PRINTING APPARATUS, AND INKJET PRINTING METHOD

BACKGROUND OF THE INVENTION

1. Field of the Invention

The present invention relates to an image processing apparatus, an inkjet printing apparatus and printing method, and more particularly, to technology that uses an image quality improving liquid, which substantially does not include color material, to suppress bronzing and interference color in a printed image, while improving glossiness and color reproduction.

2. Description of the Related Art

A technology that overcoats a print medium with yellow ink, as described in Japanese Patent Publication No. 4066338, is known as a technology that suppresses this type of bronzing. More specifically, after printing an image onto a print medium using cyan, magenta, and yellow ink, yellow ink, which produces little bronzing, is applied on the printed image with a print duty of 10% or less. This enables a reduction of bronzing for cyan hues in particular.

However, in some cases, the method disclosed in Japanese Patent Publication No. 4066338 is difficult to implement for images that use colors of many hues. More specifically, using yellow ink may cause problems that impair image quality due to changes in tint, such as lowering the saturation of certain hues and disrupting the gray balance. Also, with the method disclosed in Japanese Patent Publication No. 4066338, the phenomenon of color change in reflected light produced by thin-film interference (hereinafter also designated interference color) is not resolved.

A known technology for resolving the such problems involves printing by using ink containing ordinary color material together with clear ink which substantially does not contain color material and to which a water soluble resin that dissolve in ink is added, or ink called image quality improving liquid. This provides a certain effect of suppressing bronzing and interference color.

However, simply using such image quality improving liquid may be insufficient to improve printed image quality in some cases. First, there is room for improvement in the image quality improving liquid itself. More specifically, although the amount of the water soluble resin contained in image quality improving liquid that remains at the surface of the print medium without permeating through does control bronzing and interference color, on the other hand, the amount of image quality improving liquid also affects the glossiness and image clarity of the image. Therefore, if the amount of image quality improving liquid remaining on the print medium surface could be controlled according to the properties of the image quality improving liquid itself, it would be possible to control not only bronzing and interference color, but also glossiness and image clarity. Second, the effects of using image quality improving liquid on a print medium may differ depending on whether an inkjet printing apparatus is executing a color mode or a monochrome mode, for example. For example, in the case of applying the image quality improving liquid to the print medium during the same scan as colored ink, more irregularities are formed on the surface of the print medium compared to the case of applying the image quality improving liquid after printing an image with colored ink, and these irregularities appear themselves as differences in glossiness, image clarity, and interference color. In addition, differences in the amount of image quality improving liquid used (the amount applied per unit area) appear themselves as differences in the above bronzing.

SUMMARY OF THE INVENTION

An object of the present invention is to provide an image processing apparatus, an inkjet printing apparatus, and an inkjet printing method capable of suppressing bronzing and interference color while also improving glossiness and color reproduction by using image quality improving liquid in more suitable ways for different printing modes.

In a first aspect of the present invention, there is provided an image processing apparatus that generates print data for performing printing by using a print head ejecting to a print medium colored ink and image quality improving liquid, which includes two or more types of resins having different permeability into the print medium, to eject the colored ink and the print quality improving liquid to the print medium, the apparatus comprising: a converting unit configured to convert image data into use amount data of the colored ink and the print quality improving liquid; and a print data generating unit configured to generate print data for each of a plurality of print modes, based on the use amount data, wherein the converting unit performs conversions that differ in a use amount of the print quality improving liquid from one print mode to another, and the print data generating unit generates print data for executing a printing procedure which starts printing with the image quality improving liquid before completing printing with colored ink or a printing procedure which starts printing with the image quality improving liquid after completing printing with colored ink, for each of the plurality of print modes.

In a second aspect of the present invention, there is provided an ink jet printing apparatus that performs printing by using a print head ejecting colored ink and image quality improving liquid, which includes two or more types of resins having different permeability into a print medium, to eject the colored ink and the print quality improving liquid to the print medium, the apparatus comprising: a converting unit configured to convert image data into use amount data of the colored ink and the print quality improving liquid; a print data generating unit configured to generate print data for each of a plurality of print modes, based on the use amount data; a printing unit configured to perform printing onto the print medium based on the print data generated by said print data generating unit, wherein the converting unit performs conversions that differ in a use amount of the print quality improving liquid from one print mode to another, and the print data generating unit generates print data for executing a printing procedure which starts printing with the image quality improving liquid before completing printing with colored ink or a printing procedure which starts printing with the image quality improving liquid after completing printing with colored ink, for each of the plurality of print modes.

In a third aspect of the present invention, there is provided an ink jet printing method of performing printing by using a print head ejecting colored ink and image quality improving liquid, which includes two or more types of resins having different permeability into a print medium, to eject the colored ink and the print quality improving liquid to the print medium, the method comprising: a converting step of converting image data into use amount data of the colored ink and the print quality improving liquid; a print data generating step of generating print data for each of a plurality of print modes, based on the use amount data; a printing step of performing printing onto the print medium based on the print data generated by said print data generating step, wherein the converting step performs conversions that differ in a use amount of the print quality improving liquid from one print mode to another, and the print data generating step generates print data for executing a printing procedure which starts printing with the image quality improving liquid before completing printing with colored ink or a printing procedure which starts printing with the image quality improving liquid after completing printing with colored ink, for each of the plurality of print modes.

According to the above configuration, image quality improving liquid can be used in more suitable ways for different printing modes, making it possible to suppress bronzing and interference color while also improving glossiness and color reproduction.

Further features of the present invention will become apparent from the following description of exemplary embodiments (with reference to the attached drawings).

BRIEF DESCRIPTION OF THE DRAWINGS

FIGS. 2A and 2B are diagrams illustrating the mechanism of color change in specular light due to thin-film interference;

FIGS. 7A to 7D are diagrams illustrating gloss and haze;

DESCRIPTION OF THE EMBODIMENTS

Hereinafter, embodiments of the present invention will be described in detail and with reference to the drawings.

(Specular Light Color Change and Evaluation Method Thereof)

Color change in the specular light reflecting off a printed image is known as a phenomenon that occurs because of thin-film interference or bronzing, in which the color of reflected light from printed material is observed as having a different color than the color of the light incident on the printed material. Thin-film interference is a phenomenon that occurs in the case where the thickness of the printed color material layer is approximately the wavelength of light, in which the color of reflected light looks different depending on the angle of reflection.

Figure 1:
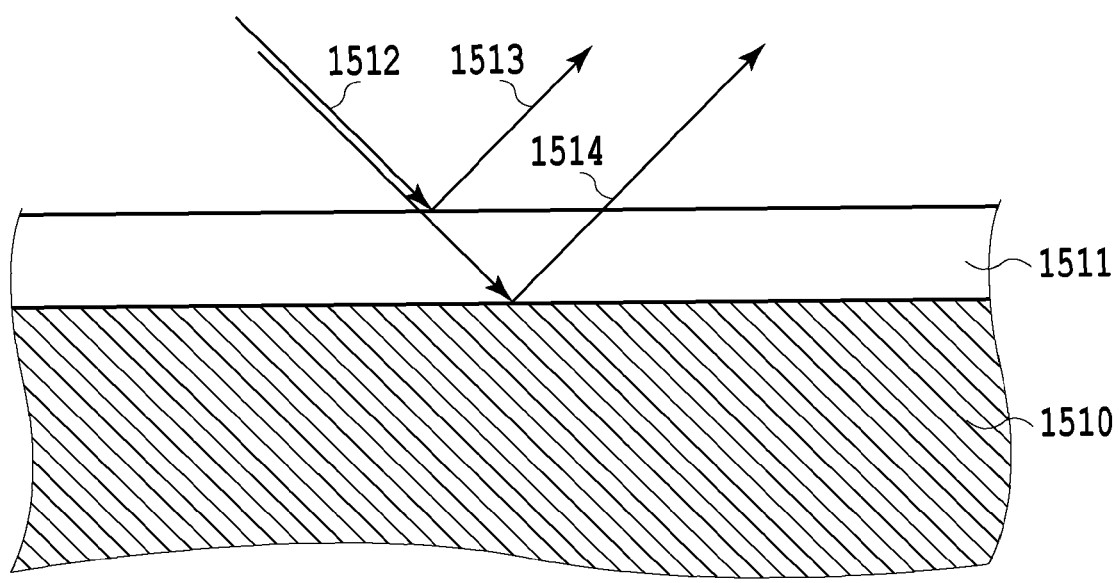
FIG. 1 is a diagram illustrating the mechanism of color change in specular light due to thin-film interference.

FIGS. 1, 2A, and 2B are diagrams illustrating the mechanism of color change in specular light due to thin-film interference. Consider the case of light 1512 incident on a thin film 1511 on top of a substrate 1510 at a 45° angle of incidence, as illustrated in FIG. 1. The reflected light from the thin film 1511 includes two light rays: reflected light 1513 from the thin film surface, and light 1514 that passed through the thin film 1511 and reflected off the bottom of the thin film. Since there is a difference in the paths traveled by these light rays (optical path difference), when combined the light intensities of the two light rays strengthen or weaken according to the relationship between the wavelength and the optical path difference (in other words, interference occurs). In the case where the optical path difference is exactly the wavelength, the peaks of the waves are superimposed to strengthen the light intensity, as illustrated in FIG. 2A. On the other hand, in the case where the optical path difference is half the wavelength, the peaks and the valleys of the wave are superimposed, weakening the light intensity, as illustrated in FIG. 2B.

Since the reflected intensity differs depending on the wavelength and optical path difference in this way, reflected light from the thin film 1511 is observed as different colors depending on the angle of reflection.

Figure 3A:
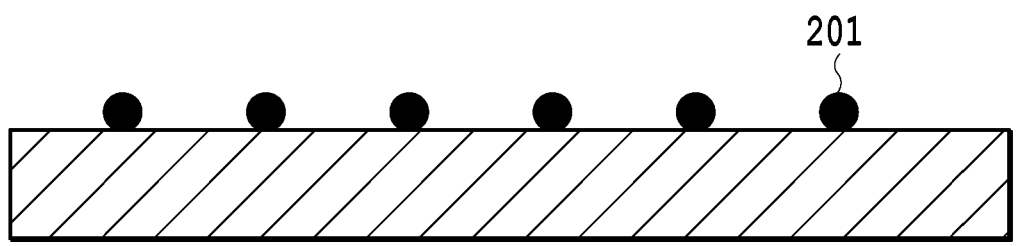
FIGS. 3A and 3B are diagrams illustrating the state of pigment material and resin fused to a sheet surface.

Meanwhile, bronzing is a phenomenon in which the specular light of illuminating light incident on a print surface printed with pigment (color material) is observed as a different color from the illuminating light. Specifically, bronzing is a phenomenon that occurs when pigment particles 201 are exposed at the print medium surface as illustrated in FIG. 3A, and occurs as a result of reflected light having an increased proportion of wavelength components in the absorption band of the pigment due to selective reflection of light at the surface of the pigment particles.

Figure 3B:
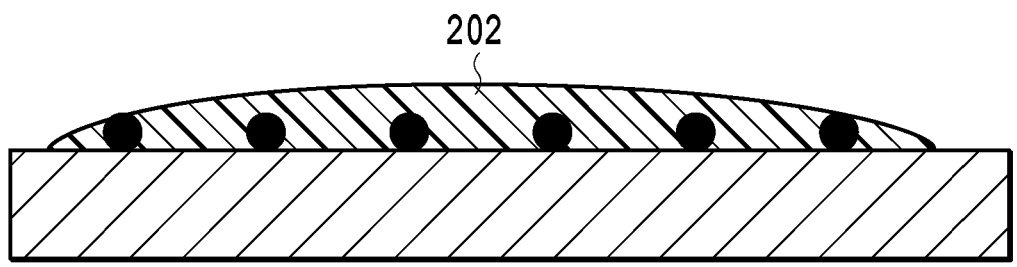

One method of suppressing such bronzing involves covering the print surface with a film 202 of laminate material or overcoat material so as to not expose pigment material at the print surface, as illustrated in FIG. 3B. However, this method is problematic because of the additional costs incurred by adding a mechanism for applying the laminate or overcoat, and the reduction in total printing speed due to inserting a post-process.

Figure 4A:
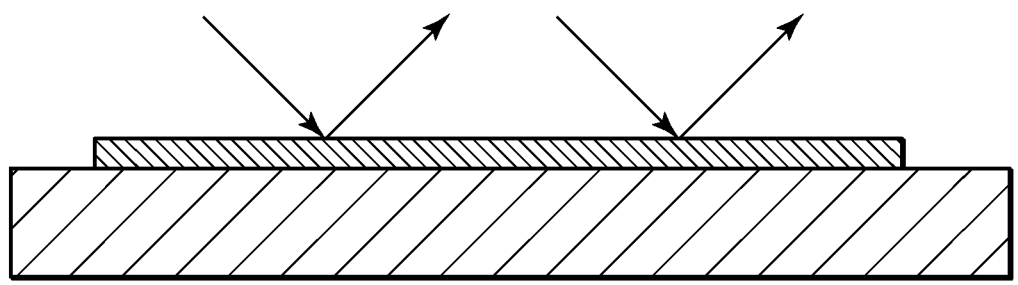
FIGS. 4A and 4B are diagrams illustrating the relationship between the surface irregularity of a print surface and the diffusion of specular light.
Figure 4B:
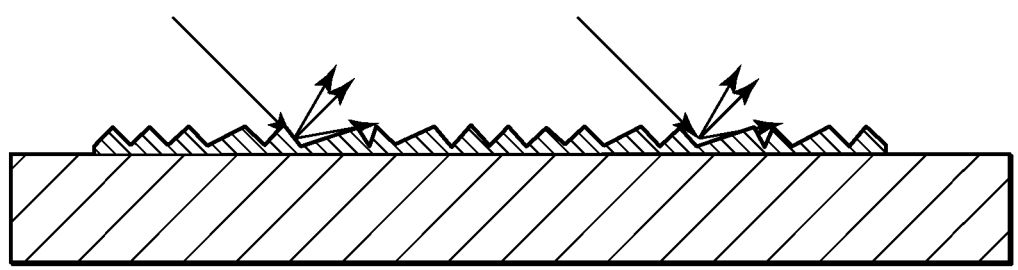

Furthermore, for a print surface in a highly smooth and glossy state as illustrated in FIG. 4A, specular light becomes more intense, and bronzing becomes more noticeable. Conversely, for a print surface in a comparatively rough state with comparatively large surface irregularities as illustrated in FIG. 4B, specular light is easily scattered at the surface and becomes less intense, and bronzing becomes less noticeable.

The method given below may be used to quantitatively measure specular light color change produced by thin-film interference and bronzing as described above. For example, the color of specular light may be measured using the Gonio-Spectrophotometric Color Measurement System (GCMS-4) from Murakami Color Research Laboratory by radiating light from a 45° angle onto a solid color patch obtained by printing pigment ink onto glossy paper, and sensing light at a 45° position in the opposite direction.

Figure 5:
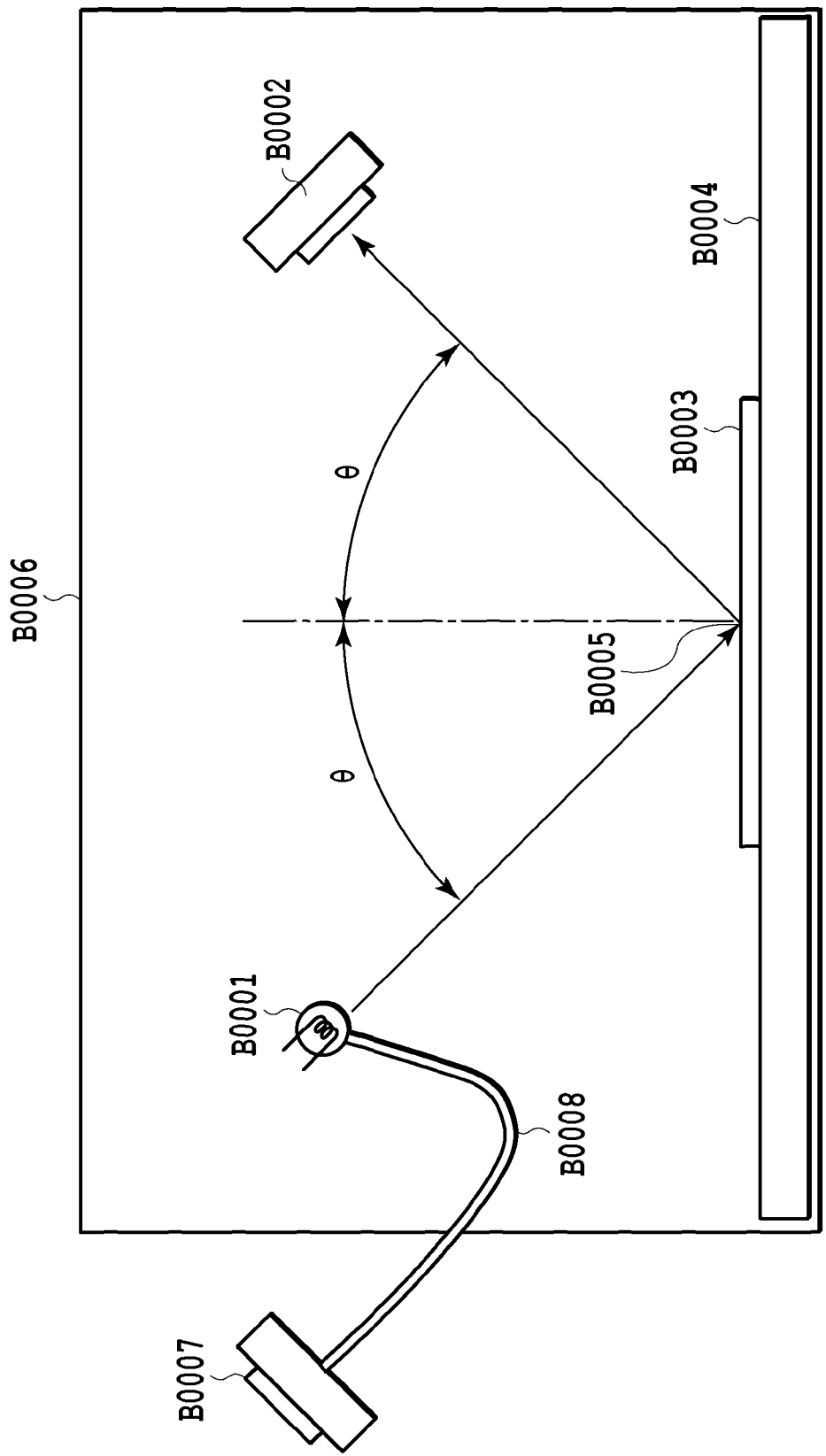
FIG. 5 is a diagram that schematically illustrates a bronze measuring system.

FIG. 5 is a diagram that schematically illustrates a measuring system. In FIG. 5, B0001 represents lighting equipment that illuminates a print medium B0003 to be evaluated. B0002 represents a photodetector that detects reflected light from the print medium B0003 to be evaluated. The photodetector B0002 is positioned opposite the lighting equipment at the same tilt angle θ with respect to the normal line of the print medium B0003, or in other words, the direction of specular reflection. B0004 represents a stationary platform that holds the print medium B0003 in place, upon which is printed a patch to be evaluated. B0005 represents a measurement site measured by the photodetector B0002. B0006 illustrates a light shielding means for shutting out external light.

Next, a method of calculating a color change characteristic of the specular light based on the measured specular light from the print medium will be explained. Tristimulus values obtained from spectral intensity Rx (λ) of the specular light from the print medium B0003 measured by the photodetector B0002 may be expressed as Xx, Yx, Zx and tristimulus values obtained from spectral intensity Sx (λ) of the specular light from the lighting equipment B0001 may be expressed as Xs, Ys, Zs. Based on these tristimulus values, L*a*b* values of specular light from the print medium B0003 is computed on the basis of JIS Z 8729. Here, as X, Y, Z values in the calculating formula in JIS 28729, tristimulus values (Xx, Yx, Zx) of the specular light from the print medium B0003 is used and as the Xn, Yn, Zn values, tristimulus values (Xs, Ys, Zs) of the light source is used.

Figure 6:
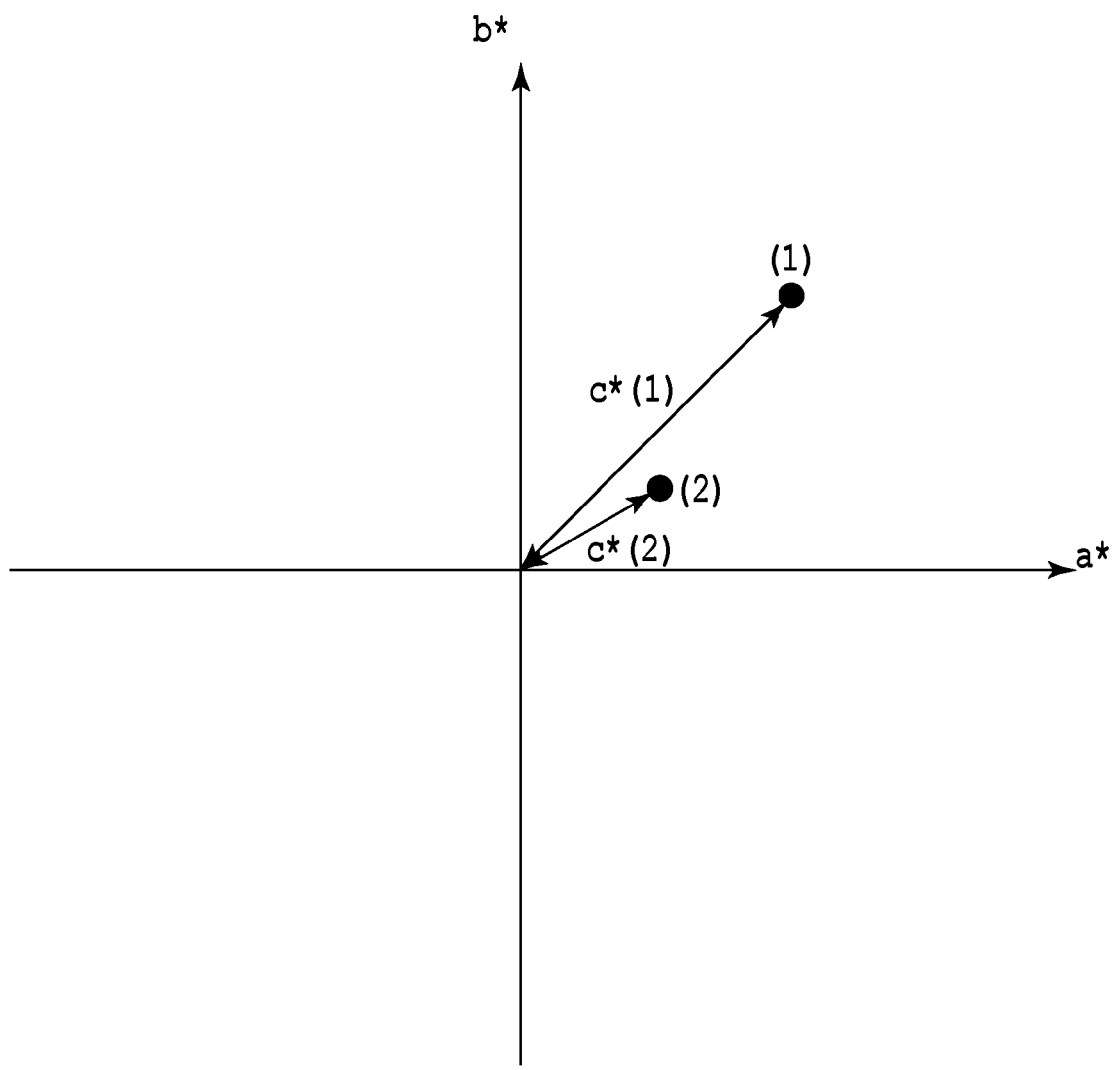
FIG. 6 is a diagram plotting the results of measuring bronze onto the a*b* plane.

FIG. 6 is a diagram illustrating, on the a*b* plane, plotting a measuring result on a printed surface according to the above measuring method. The point labeled (1) in FIG. 6 represents a plot of the L*a*b* values of the specular light whose color change is noticeable. On the other hand, the point labeled (2) represents a plot of the L*a*b* values of the specular light whose color change is not noticeable relatively. C*(1) and C*(2) indicate the results of calculating the chroma C*=sqrt (a*^2+b*^2) from the L*a*b* values of these specular light. A larger C* value indicates a color change with greater chroma, which is more noticeable as the color change of the peculiar light. By computing the hue and chroma of such color changes on the a*b* plane in this way, similarly to the L*a*b* of diffuse light when measuring ordinary color, it is possible to quantify the color change of the specular light.

(Evaluation of Glossiness and Image Clarity)

Next, the gloss level and image clarity for a print medium surface, which are standards of evaluating gloss uniformity of an image, will be explained.

As indexes for evaluating the glossiness of a print medium and an image, the gloss level and haze are used. A method of evaluating the gloss level and image clarity will be explained below.

FIGS. 7A to 7D are diagrams illustrating gloss and haze. As illustrated in FIG. 7A, values for the 20° mirror plane gloss (hereinafter designated gloss) and haze may be computed by detecting the reflected light reflected off a printed material surface with a detector (for example, the B-4632 from BYK-Gardner, Japanese product name Micro-Haze Plus). The reflected light is distributed over some angle centered about the axis of its specular light. As illustrated in FIG. 7D, the gloss may be detected through an aperture width of 1.8° at the detector center, for example, while the haze is detected over a range of ±2.7° farther outward, for example. In other words, when observing reflected light, the gloss is defined to be the reflection ratio of specular light constituting the central axis of the distribution versus the incident light. Meanwhile, the haze or haze value is defined to be the measurement of diffuse light produced near the specular light in the distribution of the reflected light. Note that the gloss and the haze measured by the above detector have dimensionless units, with the gloss conforming to JIS K5600 and the haze conforming to ISO/DIS 13803.

Image clarity may be measured using JIS H8686 (Test Methods for Image Clarity of Anodic Oxide Coatings on Aluminum and Aluminum Alloys) or JIS K7105 (Testing Methods for Optical Properties of Plastics), for example, and expresses the sharpness of an image appearing on a print medium. For example, the image clarity value decreases in the case where an illuminated image appearing on a print medium is blurry. The Image Clarity Meter ICM-1T (Suga Test Instruments) and the Image Clarity Measuring Device GP-1S (Optec) are commercially available devices for measuring image clarity that conform to JIS standards.

FIGS. 7B and 7C are diagrams illustrating how the magnitude and direction of reflected light change depending on the surface roughness of the printed image. As FIGS. 7B and 7C demonstrate, typically the reflected light scatters and the amount of specular light decreases as the surface becomes rougher, and thus smaller values are measured for image clarity and glossiness. Herein after, in the present embodiment, in the case that the measured values of image clarity is less than that of target image clarity, the image clarity is called "low". Furthermore, in the case that the measured values of gloss level is less than that of target gloss level, the gloss level is called "low".

(Apparatus Configuration)

Figure 8:
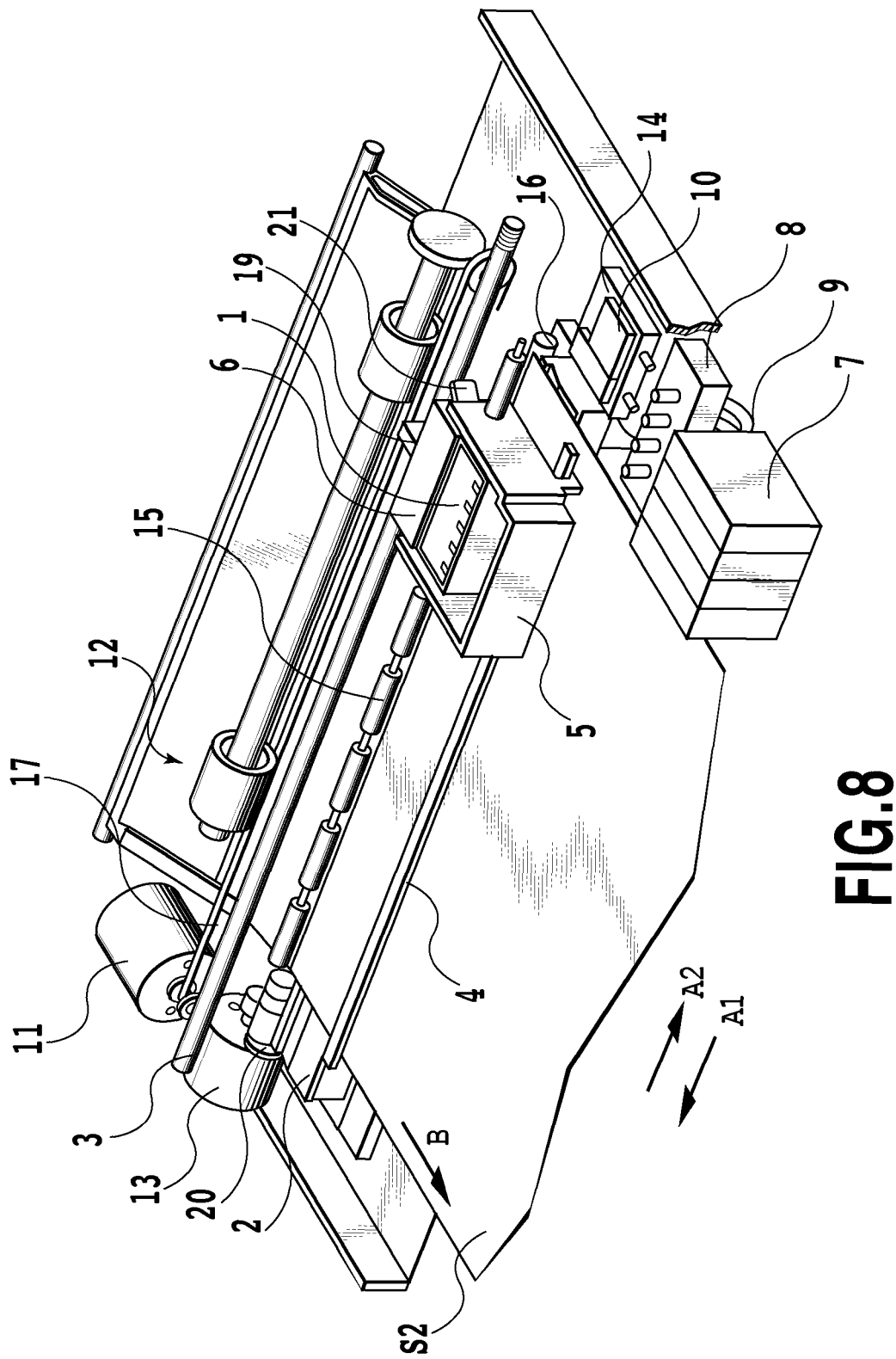
FIG. 8 is a perspective view illustrating the printing unit of an inkjet printing apparatus applying an embodiment of the present invention.
Figure 9:
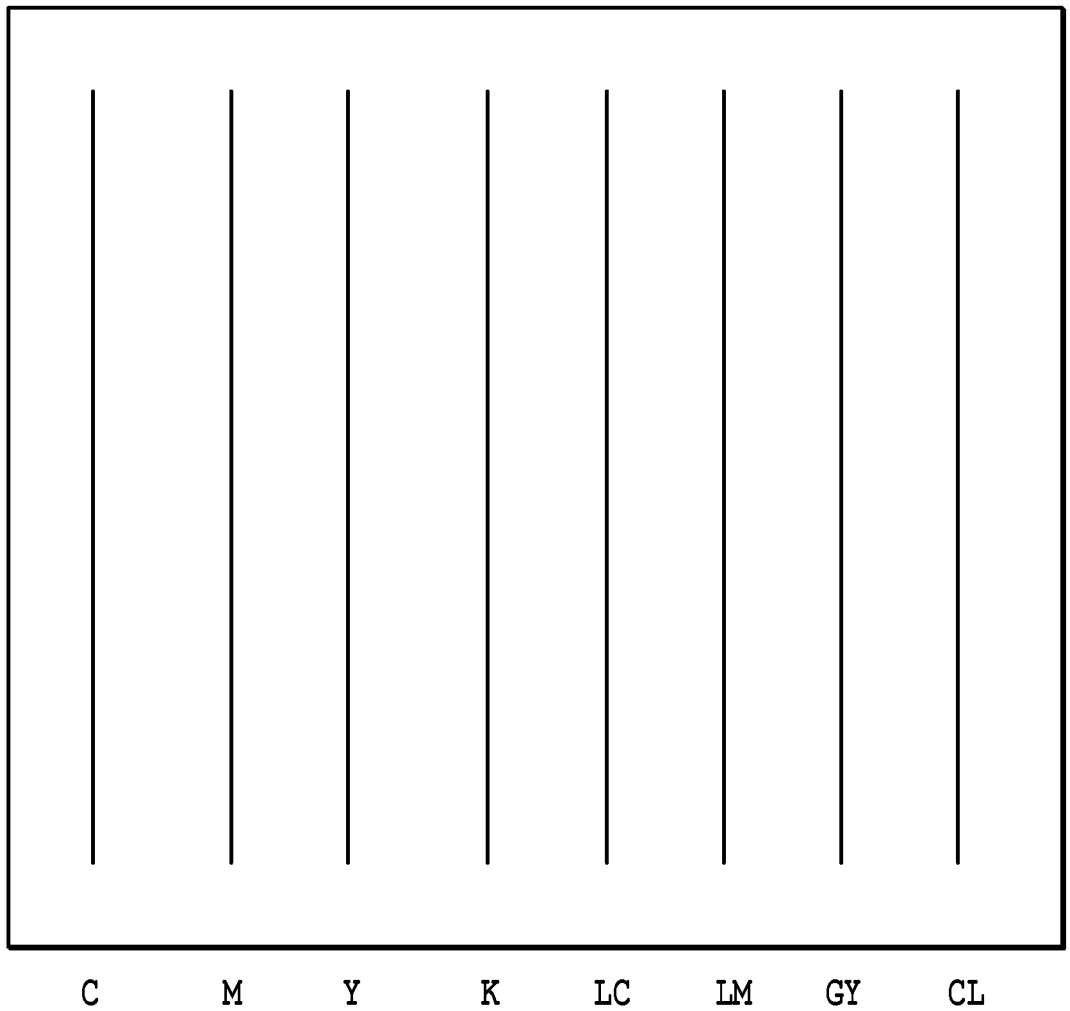
FIG. 9 is a diagram illustrating an arrangement of nozzle lines which eject colors of ink, and which are mounted onto a print head used in an embodiment of the present invention.

FIG. 8 is a perspective view primarily illustrating a configuration of a printing unit in an inkjet printing apparatus according to an embodiment of the present invention. In FIG. 8, the print head 1 mounted on the carriage 5 forms an image on a print medium S2 by ejecting ink from nozzles while moving back and forth along a guide rail 4 in the direction of the arrows A1 and A2. The print head 1 is equipped with multiple nozzle groups which respectively correspond to colored inks of respectively different colors, and image quality improving liquid, which substantially does not contain color material. FIG. 9 illustrates respective nozzle groups that eject the seven colors of colored ink in the present embodiment, these being cyan (C), magenta (M), yellow (Y), black (K), light cyan (LC), light magenta (LM), and gray (GY), as well as image quality improving liquid (CL). These respective colors of colored ink and the image quality improving liquid are stored in ink tanks (not illustrated), and supplied to the print head 1 from these ink tanks via respective ink supply channels. In the present embodiment, the ink tanks and the print head 1 are integrated to constitute a head cartridge 6, with the head cartridge 6 mounted onto the carriage 5.

Also, by transferring driving force from a carriage motor 11 to the carriage 5 via a timing belt 17, the carriage 5 is made to move back and forth, guided by a guide axle 3 and the guide rail 4 in the direction of the arrows A1 and A2 (the main scan direction). During this carriage movement, the carriage position is detected due to an encoder sensor 21 provided on the carriage 5 reading a linear scale 19 provided along the carriage movement direction. Additionally, printing onto a print medium is initiated by this back and forth movement. At this time, the print medium S2 is supplied by a feed tray 12, held between a transport roller 16 and a pinch roller 15, and conveyed to a platen 2.

Next, when the carriage 5 prints for one scan in the A1 direction, the transport roller 16 is driven by a conveyance motor 13 via a linear wheel 20. The print medium S2 is then conveyed a given amount in the direction of the arrow B, the sub-scan direction. After that, the carriage 5 prints onto the print medium S2 while scanning in the A2 direction. As illustrated in FIG. 8, a head cap 10 and a recovery unit 14 are provided at a home position, and a recovery process for the print head 1 is intermittently conducted as necessary.

When the printing for a single sheet of print medium finishes by repeating the operations described above, the print medium is delivered, thus completing the printing of a single sheet.

Figure 10:
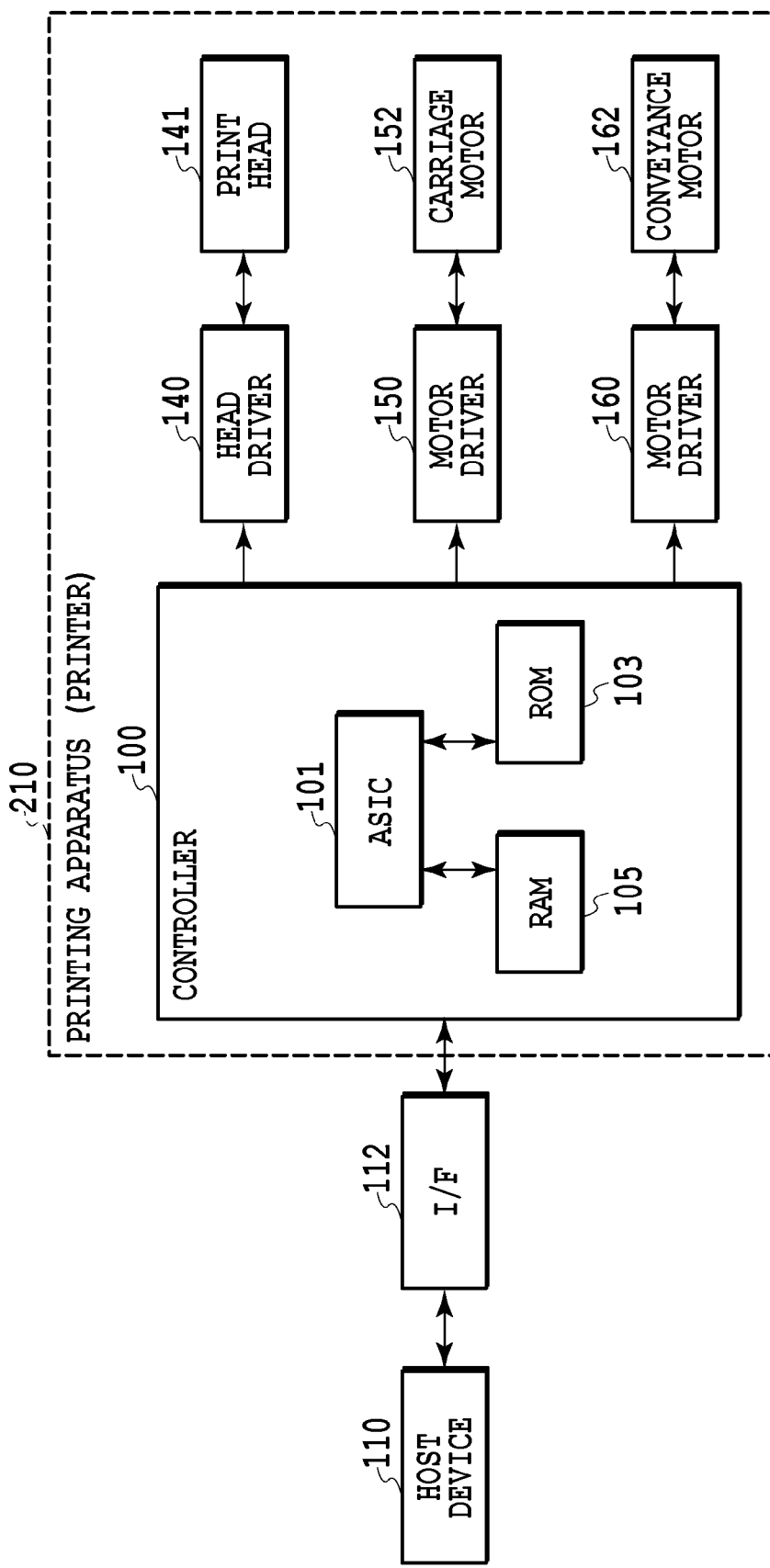
FIG. 10 is a block diagram illustrating a control configuration of an inkjet printing apparatus according to the present embodiment.

FIG. 10 is a block diagram illustrating a control configuration of the inkjet printing apparatus according to the present embodiment illustrated in FIG. 8. In FIG. 10, the controller 100 is the main control unit, and includes a microcontroller-type ASIC 101, ROM 103, and RAM 105, for example. The ROM 103 stores dot layout patterns, mask patterns, and other fixed data. The RAM 105 provides an area to load image data and a work area, for example. The ASIC 101 retrieves a program from the ROM 103, and executes a series of processes up to printing image data onto a print medium. The host device 110 is a source supplying image data to be discussed later (besides being a computer that creates or processes data such as images related to printing, the hose device 110 may also be configured as a reader or other device for scanning images). Information such as image data, other commands, and status signals are transmitted and received to and from the controller 100 via an interface (I/F) 112.

The head driver 140 drives the print head 1 according to information such as print data. The motor driver 150 drives the carriage motor 11, while the motor driver 160 drives the conveyance motor 13.

(Ink Configuration)

Next, the respective components constituting the pigment inks and the image quality improving liquid used by an inkjet printing apparatus of the present embodiment will be described.

(Aqueous Medium)

An aqueous medium containing water and a water-soluble organic solvent is preferably used for the inks used in the present invention. The content of water-soluble organic solvent in each of the inks (mass percentage) is preferably between 3.0% w/w and 50.0% w/w inclusive with respect to the total mass of the ink. Additionally, the content of water in each of the inks (mass percentage) is preferably between 50.0% w/w and 95.0% w/w inclusive with respect to the total mass of the ink.

Specifically, potential examples of substances usable as the water-soluble organic solvent include: C1-C6 alkyl alcohols such as methanol, ethanol, propanol, propanediol, butanol, butanediol, pentanol, pentanediol, hexanol, and hexanediol; amides such as dimethylformamide and dimethylacetamide; ketones or ketoalcohols such as acetone and diacetone alcohol; ethers such as tetrahydrofuran and dioxane; polyalkylene glycols such as polyethylene glycol, polypropylene glycol and others with mean molecular weights of 200, 300, 400, 600, and 1000; alkylene glycols having a C2-C6 alkylene base, such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerine; lower alkyl ethers of polyalcohols, such as ethylene glycol monomethyl (or ethyl)ether, diethylene glycol methyl (or ethyl) ether, or triethylene glycol monomethyl (or ethyl)ether; and N-methyl-2-pyrrolidone, 2-pyrrolidone, and 1,3-dimethyl-2-imidazolidinone. Also, deionized water (ion-exchanged water) is preferably used as the water.

(Pigment)

Carbon black and organic pigments are preferably used as the pigments. The content of pigment in each of the inks (mass percentage) is preferably between 0.1% w/w and 15.0% w/w inclusive with respect to the total mass of the ink. For the black ink, carbon black such as furnace black, lampblack, acetylene black, or channel black is preferably used. Specifically, potential examples of commercially available products which may be used include: Raven 7000, 5750, 5250, 5000 Ultra, 3500, 2000, 1500, 1250, 1200, 1190 Ultra II, 1170, and 1255 (Columbian); Black Pearls L, Regal 300R, 400R, and 660R, Mogul L, Monarch 700, 800, 880, 900, 1000, 1100, 1300, 1400, and 2000, and Vulcan XC-72R (Cabot); Color Black FW1, FW2, FW2V, FW18, FW200, 5150, 5160, and 5170, Printex 35, U, V, 140U, and 140V, Special Black 6, 5, 4A, and 4 (Degussa); and No. 25, No. 33, No. 40, No. 47, No. 52, No. 900, No. 2300, MCF-88, MA600, MA7, MA8, and MA100 (Mitsubishi Chemical). Carbon black newly prepared for the present invention may also be used. Obviously, the present invention is not limited to the above, and any carbon black of the related art may be used. Furthermore, the present invention is not limited to any carbon black, and substances such as magnetite or ferrite magnetic nanoparticles, and titanium black may also be used as pigment.

Specific examples of organic pigments include: water-insoluble azo pigments such as Toluidine Red, Toluidine Maroon, Hansa Yellow, Benzidine Yellow, and Pyrazolone Red; water-soluble azo pigments such as Lithol Red, Helio Bordeaux, Pigment Scarlet, and Permanent Red 2B; vat dye derivatives such as Alizarin, Indanthrone, and Thioindigo Maroon; phthalocyanine-based pigments such as Phthalocyanine Blue and Phthalocyanine Green; quinacridone-based pigments such as Quinacridone Red and Quinacridone Magenta; perylene-based pigments such as Perylene Red and Perylene Scarlet; isoindolinone-based pigments such as Isoindolinone Yellow and Isoindolinone Orange; imidazolone-based pigments such as Benzimidazolone Yellow, Benzimidazolone Orange, and Benzimidazolone Red; pyranthrone-based pigments such as Pyanthrone Red and Pyranthrone Orange; indigo-based pigments, condensed azo pigments, thioindigo-based pigments, and diketo-pyrrolo-pyrrole-based pigments; and Flavanthrone Yellow, Acylamido Yellow, Quinoline Yellow, Nickel Azo Yellow, Copper Azomethine Yellow, Perinone Orange, Anthrone Orange, Dianthraquinonyl Red, and Dioxazine Violet. Obviously, the present invention is not limited to the above.

Furthermore, when expressing organic pigments by color index (C.I.) numbers, examples of usable pigments include: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185; C.I. Pigment Orange 16, 36, 43, 51, 55, 59, 61, and 71; C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26. Obviously, the present invention is not limited to the above.

(Dispersant)

Any water-soluble plastic may be used as a dispersant to disperse pigments such as the above in the aqueous medium. More particularly, the dispersant preferably has a weight-average molecular weight between 1,000 and 30,000 inclusive, and more preferably between 3,000 and 15,000 inclusive. The content of dispersant in each of the inks (mass percentage) is preferably between 0.1% w/w and 5.0% w/w inclusive with respect to the total mass of the ink.

Specifically, potential examples of substances usable as the dispersant include: styrene, vinylnaphthalene, aliphatic alcohol esters of ethylene/α,β-unsaturated carboxylic acid, acrylic acid, maleic acid, itaconic acid, fumaric acid, vinyl acetate, vinyl pyrolidone, acrylamide, and polymers taking derivatives thereof as monomers. Note that one or more of the monomers constituting a polymer is preferably a hydrophilic monomer, and a block copolymer, random copolymer, graft copolymer, or any of their salts may be used. Alternatively, a natural resin such as rosin, shellac, or starch may also be used. Such resins are preferably soluble in an aqueous solution with a dissolved base, or in other words, are alkali-soluble.

(Surfactant)

In order to adjust the surface tension of the inks constituting the ink set, it is preferable to use a surfactant such as an anionic surfactant, a non-ionic surfactant, or an amphoteric surfactant. Specifically, substances such as polyoxyethylene alkyl ether, polyoxyethylene alkyl phenols, acetylenic glycol compounds, and acetylenic glycol ethylene oxide adducts may be used.

(Other Components)

Besides the above components, the inks constituting the ink set may also contain moisture-retaining solids such as urea, urea derivatives, trimethylolpropane, and trimethylolethane in order to stay moist. The content of moisture-retaining solids in each of the ink (mass percentage) is preferably between 0.1% w/w and 20.0% w/w inclusive, and more preferably between 3.0% w/w and 10.0% w/w inclusive with respect to the total mass of the ink. In addition, the inks constituting the ink set may also contain various additives other than the above components as necessary, such as pH adjusters, anticorrosive agents, preservatives, mold inhibitors, antioxidants, anti-reduction agents, and evaporation accelerators.

Next, the inks used in the present embodiment will be specifically described. The present invention is not limited by the following embodiment insofar as the principle matter thereof is not exceeded. Note that the terms "parts" and "%" herein are based on mass, unless specifically noted otherwise.

(Preparation of Resin Solution A)

A random copolymer with an acid value of 288 mg KOH/g, a weight-average molecular weight of 10,000, and a monomer composition of styrene/n-butyl acrylate/acrylic acid=23/37/37 was neutralized to 1 equivalent with potassium hydroxide. After that, the solution was adjusted with water to reach a resin concentration of 10.0% and obtain a resin solution A.

(Preparation of Resin Solution B)

A resin solution B was prepared similarly to the preparation of the resin solution A, except that a random copolymer with an acid value of 288 mg KOH/g, a weight-average molecular weight of 10,000, and a monomer composition of styrene/n-butyl acrylate/acrylic acid=23/37/37 was used instead of the styrene/acrylic acid random copolymer with an acid value of 200 mg KOH/g, a weight-average molecular weight of 10,000 that was used in the resin solution A.

Also, the above resin solution B may be a styrene/acrylic acid copolymer, or a random copolymer with an acid value of 203 mg KOH/g, a weight-average molecular weight of 10,000, and a monomer composition of styrene/acrylic acid=70/30. The resin solution B features high infiltration and does not readily remain on the sheet surface. Also, the resin solution B used for the image quality improving liquid is not limited to the present embodiment, insofar as the image quality improving liquid created using the resin solution B is a colorless, transparent ink that at least improves gloss, or achieves similar effects.

(Preparation of Resin Solution C)

A resin solution C was prepared similarly to the preparation of the resin solution A, except that a random copolymer with an acid value of 210 mg KOH/g, a weight-average molecular weight of 10,000, and a monomer composition of styrene/n-butyl acrylate/acrylic acid=33/30/27 was used instead of the styrene/acrylic acid random copolymer with an acid value of 200 mg KOH/g and a weight-average molecular weight of 10,000 that was used in the resin solution A. The resin solution C features low infiltration and readily remains on the sheet surface. Also, the resin solution C used for the image quality improving liquid is not limited to the present embodiment, insofar as the image quality improving liquid created using the resin solution C is a colorless, transparent ink that at least improves bronzing and thin-film interference, or achieves similar effects.

(Preparation of Pigment Dispersions 1 to 4)

Pigment dispersions 1 to 4 were prepared according to the procedure indicated below.

<Preparation of Pigment Dispersion 1 Containing C.I. Pigment Red 122>

10 parts pigment (C.I. Pigment Red 122) were mixed with 20 parts resin solution A and 70 parts ion-exchanged water, and dispersed for three hours using a batch-type vertical sand mill. After that, coarse particulate was removed by a centrifugation process. Additionally, the mixture was filtered under pressure through a cellulose acetate filter (Advantec) with a pore size of 3.0 μm to obtain the pigment dispersion 1 with a pigment concentration of 10% w/w.

<Preparation of Pigment Dispersion 2 Containing C.I. Pigment Blue 15:3>

10 parts pigment (C.I. Pigment Blue 15:3) were mixed with 20 parts resin solution A and 70 parts ion-exchanged water, and dispersed for five hours using a batch-type vertical sand mill. After that, coarse particulate was removed by a centrifugation process. Additionally, the mixture was filtered under pressure through a cellulose acetate filter (Advantec) with a pore size of 3.0 μm to obtain the pigment dispersion 2 with a pigment concentration of 10% w/w.

<Preparation of Pigment Dispersion 3 Containing C.I. Pigment Yellow 74>

10 parts pigment (C.I. Pigment Yellow 74) were mixed with 20 parts resin solution A and 70 parts ion-exchanged water, and dispersed for one hour using a batch-type vertical sand mill. After that, coarse particulate was removed by a centrifugation process. Additionally, the mixture was filtered under pressure through a cellulose acetate filter (Advantec) with a pore size of 3.0 μm to obtain the pigment dispersion 3 with a pigment concentration of 10% w/w.

<Preparation of Pigment Dispersion 4 Containing C.I. Pigment Black 7>

10 parts carbon black pigment (C.I. Pigment Black 7) were mixed with 20 parts resin solution A and 70 parts ion-exchanged water, and dispersed for three hours using a batch-type vertical sand mill. Note that the circumferential velocity during the dispersion was twice that during the preparation of the pigment dispersion 1. After that, coarse particulate was removed by a centrifugation process. Additionally, the mixture was filtered under pressure through a cellulose acetate filter (Advantec) with a pore size of 3.0 μm to obtain the pigment dispersion 4 with a pigment concentration of 10% w/w.

(Preparation of Colored Ink and Image Quality Improving Liquid)

After mixing and sufficiently stirring the respective components indicated in the table below, the mixtures were filtered under pressure through a cellulose acetate filter (Advantec) with a pore size of 0.8 μm to prepare inks 1 to 7 and image quality improving liquid CL.

As indicated in the table below, the image quality improving liquid CL is created by mixing the resin solution B having high infiltration with respect to the print medium and the resin solution C having low infiltration in a 1:1 ratio. Note that although the resin solutions B and C are mixed in an equal ratio in the present embodiment, application of the present invention is not limited thereto. The resin solution B having high infiltration achieves the effect of improving gloss as discussed earlier, while the resin solution C having low infiltration achieves the effect of improving bronzing and thin-film interference as discussed earlier. Thus, it is also possible to adjust the proportions of the resin solutions according to the properties of the colored inks to be used in conjunction with the image quality improving liquid.

The compositions of the color material ink (colored ink) and the image quality improving liquid of the present embodiment described above are summarized in the table below.

TABLE 1

| | | Ink | | | | | | | |
|---|---|---|---|---|---|---|---|---|---|
| | | 1 | 2 | 3 | 4 | 5 | 6 | 7 | 8 |
| Pigment dispersion | 1 | 40 | 10 | | | | | | |
| | 2 | | | 40 | 10 | | | | |
| | 3 | | | | | 40 | | | |
| | 4 | | | | | | 30 | 10 | |

TABLE 1-continued

| | Ink | | | | | | | |
|---|---|---|---|---|---|---|---|---|
| | 1 | 2 | 3 | 4 | 5 | 6 | 7 | 8 |
| Resin solution B | 5 | | | | | | | 1 |
| Glycerin | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 |
| Polyethylene glycol 1000 | 5.0 | 5.0 | 5.0 | 5.0 | 5.0 | 5.0 | 5.0 | 5.0 |
| Surfynol 465 | 1.0 | 1.0 | 1.0 | 1.0 | 1.0 | 1.0 | 1.0 | 1.0 |
| Ion-exchanged water | 44 | 74 | 44 | 74 | 44 | 54 | 74 | 83 |
| Ink type | M | Lm | C | Lc | Y | K | Gy | CL |

First Embodiment

Figure 11:
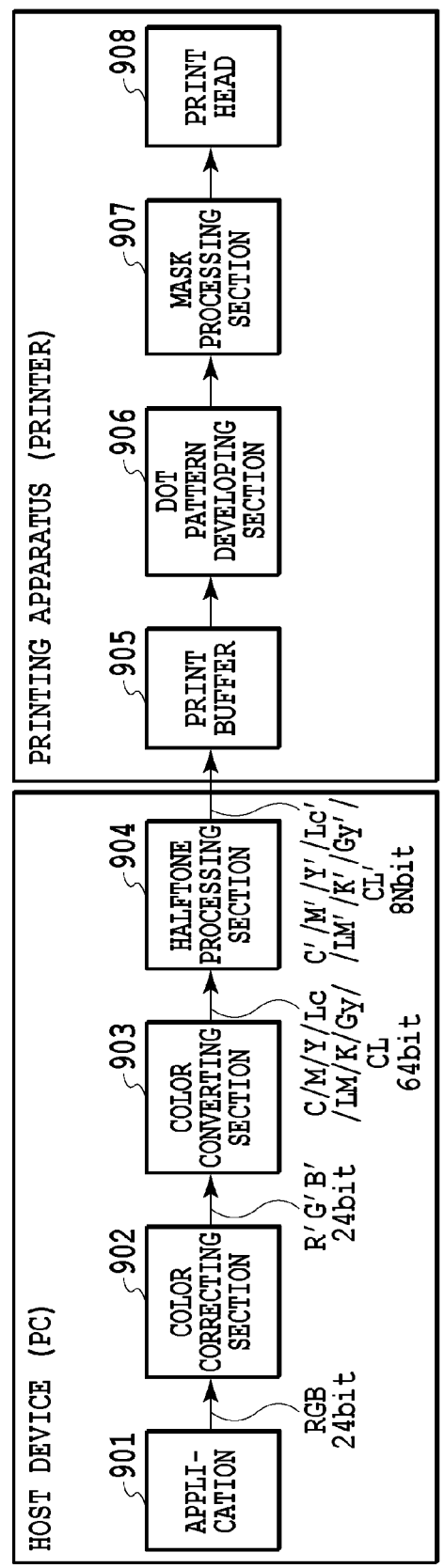
FIG. 11 is a block diagram illustrating an image processing configuration of an inkjet printing apparatus of the present invention.

FIG. 11 is a block diagram illustrating an image processing configuration in a printing system made up of an inkjet printing apparatus according to an embodiment of the present invention and a personal computer (PC) that acts as the host device thereof. Note that image processing executed by the printing system illustrated in FIG. 11 is realized by control and processing elements in the PC and printer illustrated in FIG. 10, respectively. Note also that application of the present invention is obviously not limited to this embodiment. For example, the image processing units up to the mask processing section illustrated in FIG. 11 may be incorporated into the PC, or alternatively, the image processing units of the color processor and thereafter may be incorporated into the printer. In this specification, the image processing units configured in this way are designated an image processing apparatus.

Image data processed by an application 901 on the PC is input into a color correcting section 902 also on the PC as RGB image data with 8 bits per color, for a total of 24 bits.

The color correcting section 902 converts input RGB data into different R'G'B' image data. This color correction process is conducted using a conversion process according to a three-dimensional LUT and interpolation operations. The LUT may include multiple sets of values depending on the type of color correction, and may be set as appropriate by user selection and application settings. For example, a photo tone LUT may be used in the case of outputting a photographic image, whereas a graphics tone LUT may be selected in the case of outputting a graphical image.

The color converting section 903 uses color conversion tables discussed later with drawings such as FIGS. 24A and 24B to convert the RGB image data obtained by the color correcting section 902 into image data (ink usage amount data) made up of signals for the colors C, M, Y, LC, LM, K, and GY of the colored inks used by the inkjet printing apparatus, as well as a signal CL for the image quality improving liquid. The output signal uses 8 bits per color, thus becoming 64-bit output data for eight colors.

The halftone processing section 904 performs a halftoning process such as error diffusion to convert a multi-valued input signal with 8 bits per color, or 256 values, into N-valued data that is less than 256 values. Specifically, the N value is multi-level, with 2 to 4 bits per color, for approximately 3 to 16 values. Note that although the present embodiment illustrates an example of a halftoning process that yields multi-level data, the configuration is not limited thereto, and a halftoning process that yields binary data is also acceptable.

Figure 12:
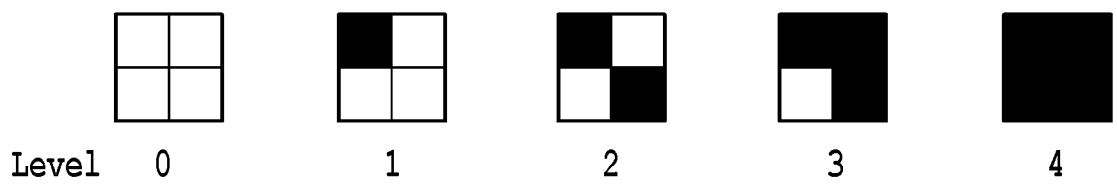
FIG. 12 is a diagram illustrating dot patterns used by an inkjet printing apparatus of the present invention.

The N-valued image data obtained by the halftoning process from the PC is transferred to the inkjet printing apparatus (printer) and stored in a print buffer 905. A dot pattern developing section 906 retrieves the N-valued data stored in the print buffer 905, and develops dot patterns according to the N values. FIG. 12 is a diagram illustrating dot patterns. The example depicted in FIG. 12 illustrates dot patterns for the N=5 case, in which 2-pixel by 2-pixel dot patterns are determined in correspondence with each of the levels 0, 1, 2, 3, and 4 expressed by the 5-valued image data. Each pattern represents binary data, in which pixels shaded black indicate dots which are ON, while white pixels indicate dots which are OFF. In other words, the dot pattern development yields binary data at double the resolution in the scan direction and in the sub-scan direction, respectively. Respective dot patterns corresponding to each signal value (pixel value) are similarly developed for the image quality improving liquid image data CL, yielding binary data for each.

Next, the mask processing section 907 divides the binary data for each ink obtained by the dot pattern developing section 906 into data corresponding to multiple scans by the print head. This process is conducted using mask patterns (hereinafter also referred to as masks). The mask processing section 907 masks the data for the colored inks C, M, Y, LC, LM, K, and GY as well as the image quality improving liquid data CL, thus generating respective print data. Ink and image quality improving liquid is then ejected from respective nozzles of the print head 908 on the basis of the generated print data.

Figure 13:
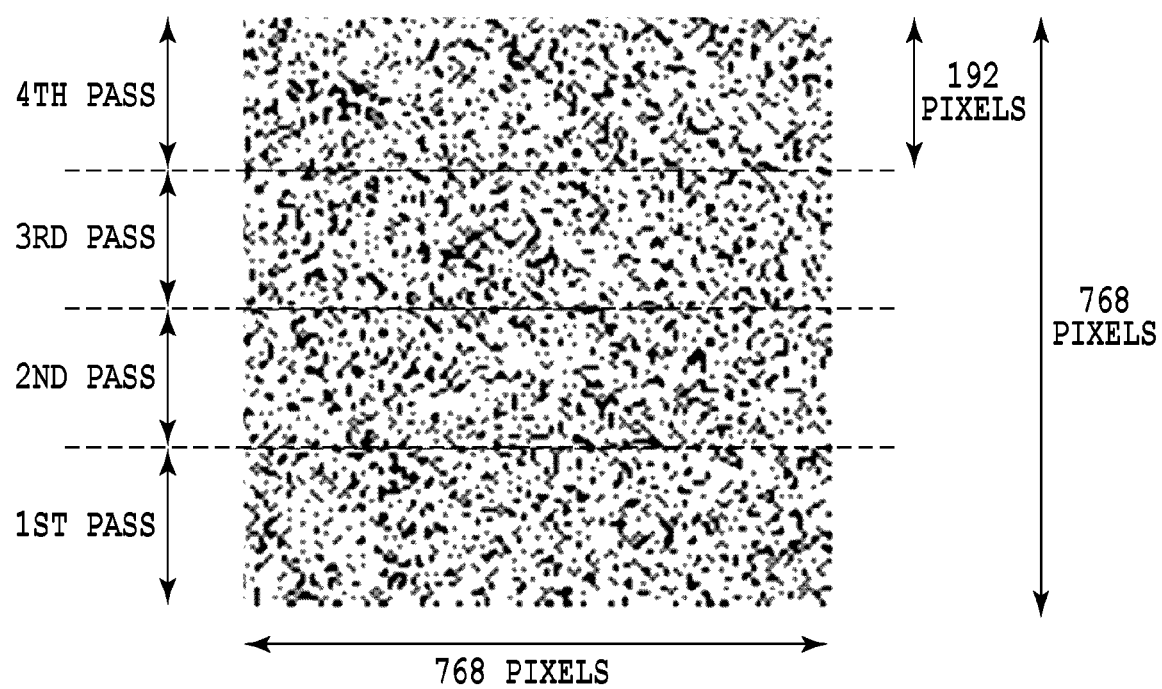
FIG. 13 is a diagram illustrating a mask pattern used in multi-pass printing.

FIG. 13 is a diagram illustrating an example of a mask used by the mask processing section 907, and illustrates a mask for 4-pass printing which completes printing with four scans. In this mask pattern, pixels turned ON in a particular pass are represented with black dots while pixels turned OFF are represented with white dots, with the dot layout being randomly arranged. The vertical-by-horizontal pixel size is 768 pixels by 768 pixels, with the vertical direction corresponding to the nozzle line direction in the print head, and the horizontal direction corresponding to the main scan direction in which the print head scans. Furthermore, the vertical pixel size of 768 corresponds to the 768 nozzles in the print head. The 192-pixel divided mask areas, which are obtained by dividing the 768 pixels in the vertical direction into four divisions whose boundaries are indicated by the broken lines in FIG. 13, are mask patterns respectively corresponding to 1st to 4th passes. Furthermore, these mask patterns for 1st to 4th passes exist in a complementary relationship. The mask patterns for 1st to 4th passes in this example have nearly the same duty, or in other words, a duty of approximately 25%.

Figure 14:
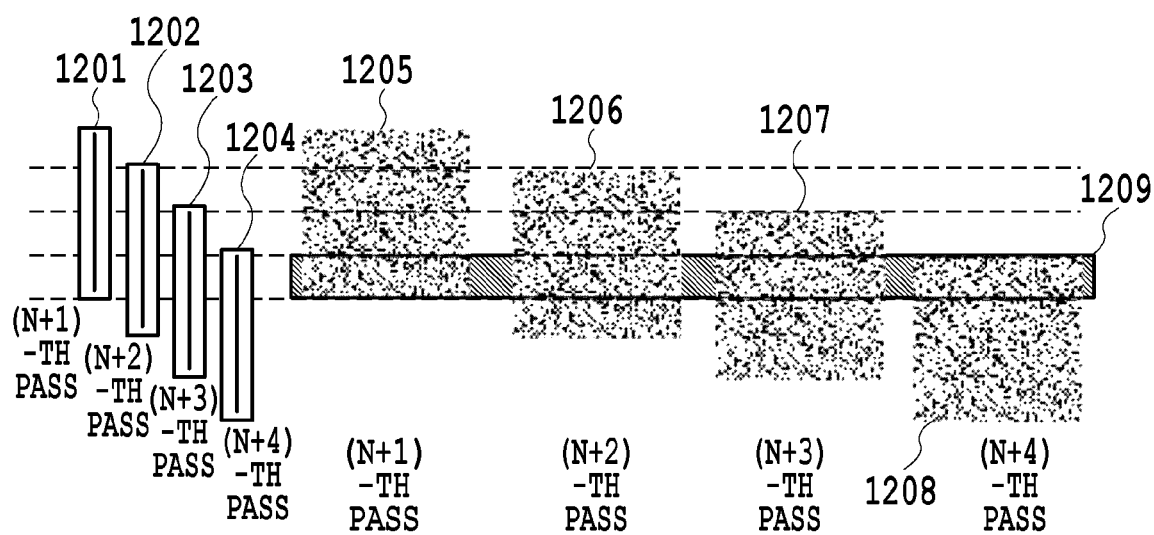
FIG. 14 is a diagram illustrating a multi-pass printing process using the mask pattern illustrated in FIG. 13.

FIG. 14 is a diagram illustrating multi-pass printing using the mask pattern illustrated in FIG. 13. In FIG. 14, reference numerals 1201 to 1204 indicate the print head (in FIG. 14, the print head is illustrated for only one color for simplicity), while 1205 to 1208 indicate a mask pattern statically associated with nozzles of the print head. More specifically, when performing 4-pass multi-pass printing, with every scan the print sheet is transported a distance equivalent to the width of a divided mask area of the mask, or in other words, the wide corresponding to a nozzle group made up of 192 nozzles which are obtained by dividing the 768 nozzles into four divisions. In addition, FIG. 14 also illustrates how the divided mask area to be applied changes with respect to one unit area 1209 whose printing onto the print sheet is completed. Specifically, in pass N+1, the lowermost divided mask area in FIG. 14 is used to print onto the unit area 1209 with the corresponding nozzle group. Thereafter, the second, third, and fourth divided mask areas from the bottom are similarly used to print with their corresponding nozzle groups in pass N+2, pass N+3, and pass N+4, and the printing of the unit area is completed. Note that the mask pattern described herein is an example of a mask pattern used for common printing discussed later.

Hereinafter, an embodiment with a configuration characteristic of the present invention will be described.

(Relationship Between Image Quality Improving Liquid and Image Clarity/Gloss Level, Bronzing/Thin-Film Interference)

Hereinafter, the image quality improving liquid characteristic of the present invention as well as its properties and effects will be described.

Figure 15A:
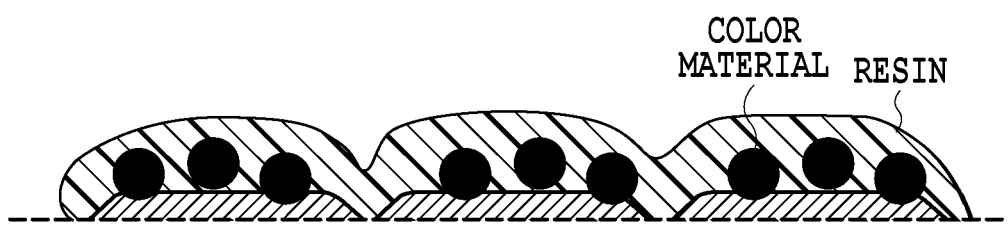
FIGS. 15A and 15B are diagrams illustrating differences in how easily two different types of water-soluble resins contained in image quality improving liquid remain on a sheet surface.
Figure 15B:
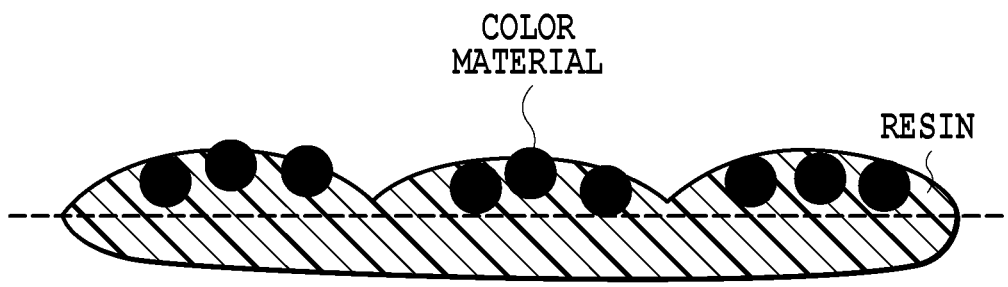

First, differences in how easily two different types of water-soluble resins contained in image quality improving liquid remain on a sheet surface will be described. A resin with high water solubility does not readily separate into a liquid component and a solid component. More specifically, a resin whose solid and liquid components have not separated easily infiltrates into the print medium, and does not readily remain at the surface layer of the print medium, as illustrated in FIG. 15B. As a result, although irregularities at the printing surface layer do not readily form and image clarity does not readily fall, there is a tendency for interference and bronzing suppression effects to be small. Also, the resin with high water solubility used in the present embodiment has a refractive index that is less than the refractive index of pigment material. As a result, the amount of specular light decreases, and thus gloss level decreases.

On the other hand, a resin with low water solubility readily separates into a liquid component and a solid component after being applied to a print medium. More specifically, being a solid component, the resin does not readily infiltrate into the print medium, and readily remains at the surface layer of the print medium, as illustrated in FIG. 15A. As a result, irregularities at the printing surface layer readily form, gloss level and image clarity readily fall, and there is a tendency for thin-film interference to not readily form. Also, since the color material layer is covered by resin and there is less color material exposed at the surface layer, there is a tendency for bronzing to be suppressed.

The image quality improving liquid used in the present embodiment is created with a mixture of a resin solution B (hardly remains on sheet surface) and a resin solution C (easily remains on sheet surface) which contain water-soluble resins with different properties related to the ease of infiltration discussed above. Thus, an effect combining the respective characteristics of the individual resin solutions is achieved according to the mixture ratio.

Figure 16A:
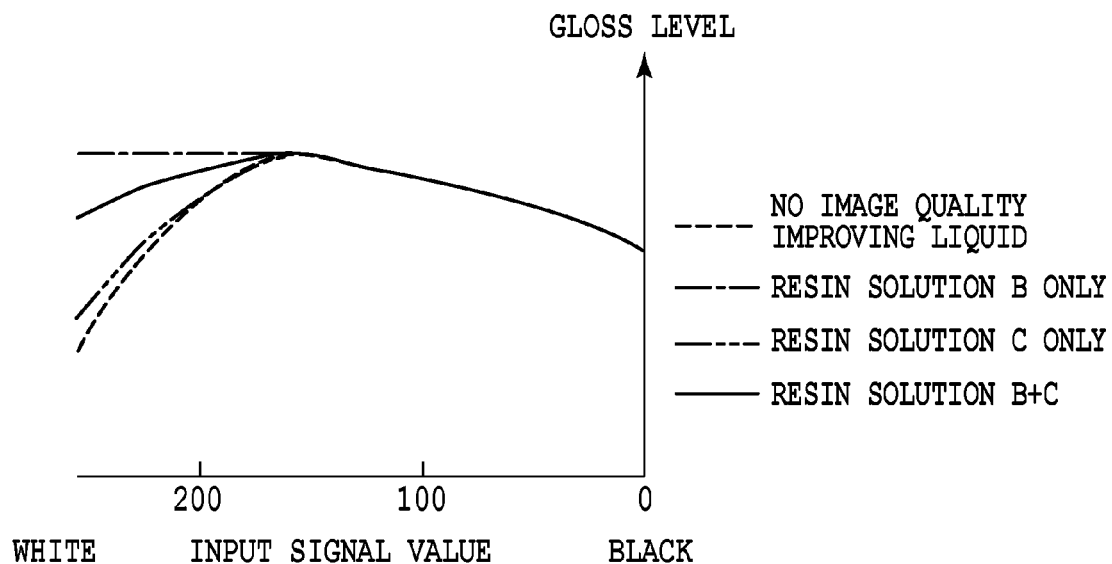
FIGS. 16A and 16B are diagrams illustrating the gloss and image clarity of printed material in the case of no image quality improving liquid, the case of creating a image quality improving liquid with a single resin solution, and the case of creating a image quality improving liquid with a mixture of two types of resin solutions.
Figure 16B:
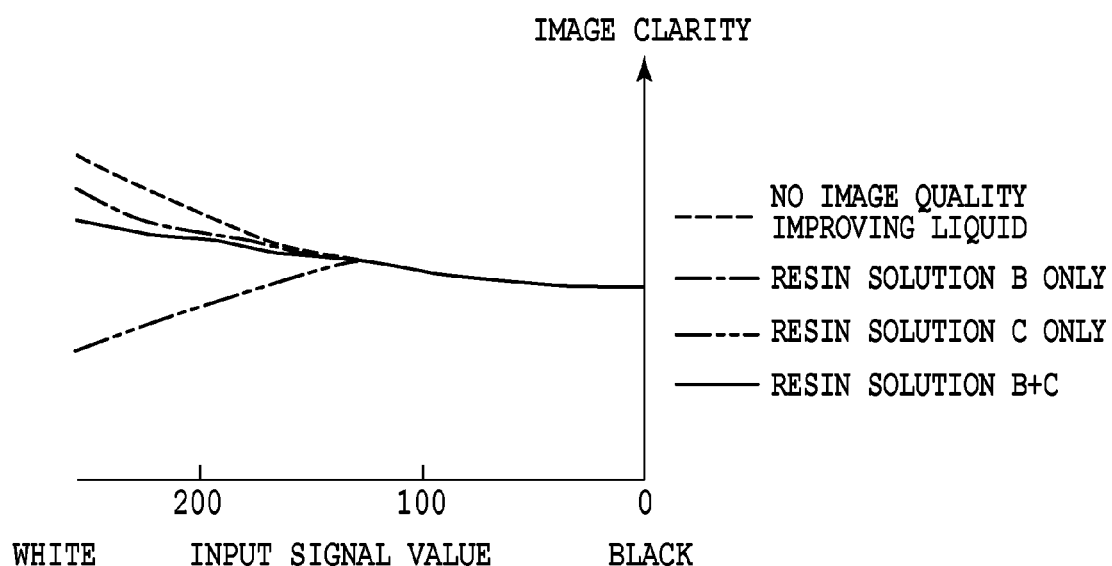

FIGS. 16A and 16B are diagrams respectively illustrating the gloss level and image clarity of printed material in the case of no image quality improving liquid, the case of creating a image quality improving liquid with only the resin solution B or the resin solution C, and the case of the present embodiment in which a image quality improving liquid is created by mixing the resin solution B and the resin solution C. FIGS. 16A and 16B plot results obtained by measuring a printed patch with the gloss level and image clarity measurement methods discussed earlier for individual gradations on a gray line proceeding from paper white (255) to black (0).

As illustrated in FIG. 16A, in the case of no image quality improving liquid, the gloss level is low in the highlight portion near paper white, with the gloss level rising in the intermediate gradations, and gradually falling towards black in the high density portion. Particularly, the difference (change) in gloss level from highlight to intermediate gradations may easily look unnatural and impart a bad impression regarding gloss uniformity.

Meanwhile, in the case of using an image quality improving liquid created with the resin solution B only, there is high gloss level when printing at 20% duty from the highlight portion to the intermediate gradation portion, with little difference in gloss level from the above highlight portion to the intermediate gradation portion, and the unnatural look is also eliminated. In the case of using a image quality improving liquid with only the resin solution C that easily remains on the sheet surface, the resulting gloss level is not very different from the case of no image quality improving liquid. This is because in the case of using an image quality improving liquid with only the resin solution C, the image clarity drops significantly compared to the case of no image quality improving liquid, as illustrated in FIG. 16B. Since the resin solution B does not readily remain on the sheet surface, the image clarity does not decrease as much, but since the resin solution C readily remains on the sheet surface, the sheet surface is roughened more easily, and image clarity also decreases. If the image clarity decreases, the diffuse light near the specular light increases, thus causing the specular light intensity to decrease by an equivalent amount. As a result, the gloss level also falls.

In the case of the present embodiment, in which a image quality improving liquid created by mixing the resin solutions B and C is used, the gloss level when similarly printing at 20% duty from the highlight portion to the intermediate gradation portion does decreases somewhat compared to the case of using a image quality improving liquid with only the resin solution B, but compared to the case of no image quality improving liquid, the unnatural look due to the difference (change) in gloss level from the highlight portion to the intermediate gradation portion is significantly suppressed.

Figure 17:
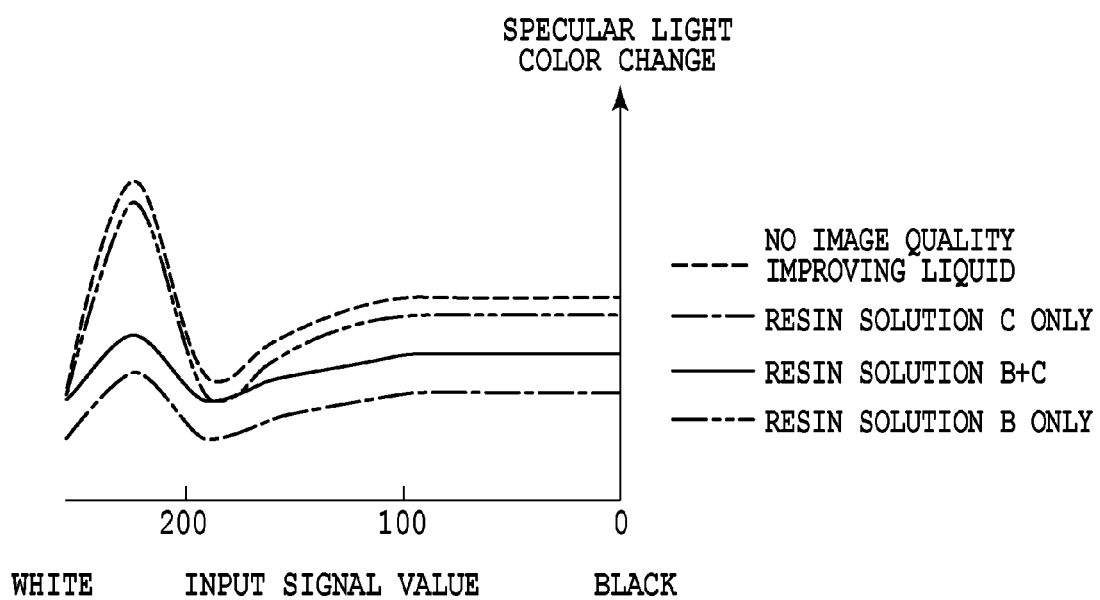
FIG. 17 is a diagram illustrating the specular light color change of printed material in the case of no image quality improving liquid, the case of creating a image quality improving liquid with a single resin solution, and the case of creating a image quality improving liquid with a mixture of two types of resin solutions.

FIG. 17 is a diagram illustrating the color change in specular light from printed material in the case of no image quality improving liquid, the case of using a image quality improving liquid with only the resin solution B which hardly remains on the sheet surface or with only the resin solution C which easily remains on the sheet surface, and the case of the present embodiment which uses a image quality improving liquid created by mixing the resin solution B and the resin solution C. FIG. 17 plots results obtained by measuring the color change of a printed patch for individual gradations on a gray line proceeding from paper white (255) to black (0), similarly to FIGS. 16A and 16B.

As illustrated in FIG. 17, in the case of no image quality improving liquid, color change in the specular light produced by thin-film interference is extremely large in the highlight portion, and in addition, color change in the specular light due to bronzing is also large for intermediate gradations and above.

Also, in the case of using an image quality improving liquid created with only the resin solution B which hardly remains on the sheet surface, there is little effect of reducing thin-film interference and bronzing when printing at 20% duty over all tone regions.

Meanwhile, in the case of using an image quality improving liquid created with only the resin solution C, color change in the specular light is reduced over all gradations. This is because in the highlight portion, the surface is roughened by the resin which easily remains on the sheet surface, inhibiting thin-film interference, while for intermediate gradations and above, resin covers over the color material, inhibiting bronzing.

For the case of using a image quality improving liquid created by mixing the resin solution B and the resin solution C according to the present embodiment, FIG. 17 shows that although there is a slightly reduced effect with respect to color change in the specular light when similarly printing at 20% duty over all gradations compared to the case of the resin solution C only, a significant color change reducing effect is obtained compared to the case of no image quality improving liquid.

As described above, the effects of the resin solution B and the resin solution C are reciprocal with respect to gloss level, image clarity, and color change in specular light. Given this result, by obtaining a balanced mixture of the resin solution B and the resin solution C, it becomes possible to combine the image quality-enhancing effects of both resin solutions, and thereby minimize their respective drawbacks.

(Relationship Between Image Quality Improving Liquid Printing Method and Image Clarity/Gloss Level, Bronzing/Thin-Film Interference)

Figure 18A:
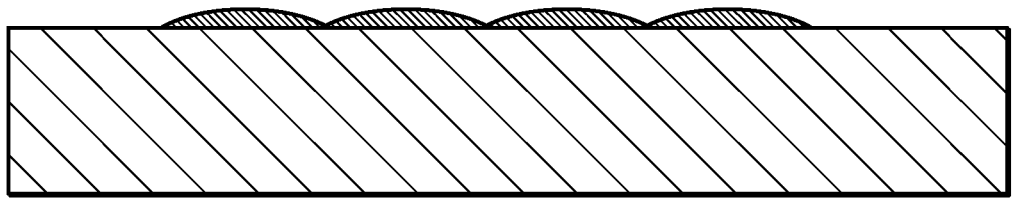
FIGS. 18A to 18C are diagrams illustrating differences between image clarity and gloss, as well as between bronze and thin-film interference, due to differences in image quality improving liquid printing methods.
Figure 18B:
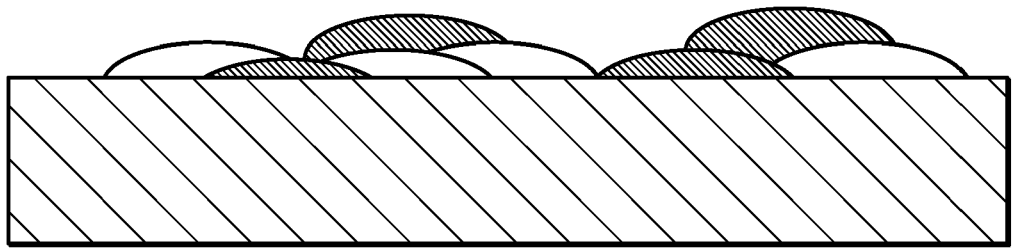
Figure 18C:
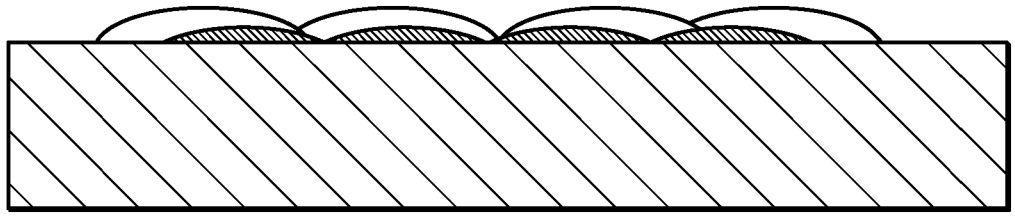

FIGS. 18A to 18C are diagrams illustrating differences between image clarity and gloss level, as well as between bronze and thin-film interference, due to differences in image quality improving liquid printing methods (printing modes). FIG. 18A illustrates a state in which image quality improving liquid is not printed. Meanwhile, FIGS. 18B and 18C illustrate the case of printing image quality improving liquid by common printing and after application printing discussed later, respectively.

With a printing method that starts printing with image quality improving liquid before completing printing with colored ink (hereinafter also referred to as common printing), such as a printing method that applies colored ink and image quality improving liquid during the same scan, for example, the smoothness of the print surface decreases as illustrated in FIG. 18B, and as a result, image clarity and glossiness readily decrease. This is because the ink droplets of the colored ink, which contains many color materials and polymers that readily remain on the sheet surface, tend to inhibit the permeation of liquid droplets that later land on the sheet surface. Also, the sheet is wetted differently depending on the type of paper and differences in surface tension between ink and liquid droplets. In this way, ejected droplets wet the sheet differently upon landing and have different permeation speeds depending on the droplet type and the surface state of the print medium. As a result, fixed dots have varying heights, and smoothness decreases. This tendency becomes more pronounced with more types of colored ink in use and also with greater quantities of such colored ink and image quality improving liquid. In this way, common printing decreases smoothness, and thus bronzing and thin-film interference are also lessened.

On the other hand, with a printing method that starts printing with image quality improving liquid after completing printing with colored ink (hereinafter also referred to as after application printing), the smoothness of the print surface is maintained, as illustrated in FIG. 18C. For this reason, image clarity is less likely to decrease, and there is a tendency for only the gloss to change greatly according to the amount of image quality improving liquid. In the present embodiment, the refractive index of the water-soluble resin used for the image quality improving liquid is higher than blank paper but lower than color material. Thus, the gloss level increases in highlight portions where the quantity of colored ink is small and blank paper occupies a large proportion of the surface area, and the gloss level decreases in the high-density portion starting from the intermediate gradations where the quantity of colored ink is large and blank paper occupies a small proportion of the surface area. Since the sheet surface is kept highly smooth with after application printing, bronzing and thin-film interference readily occur.

(Common Printing and after Application Printing)

Next, specific examples of the common printing method and the after application printing method discussed above will be described.

Figure 19A:
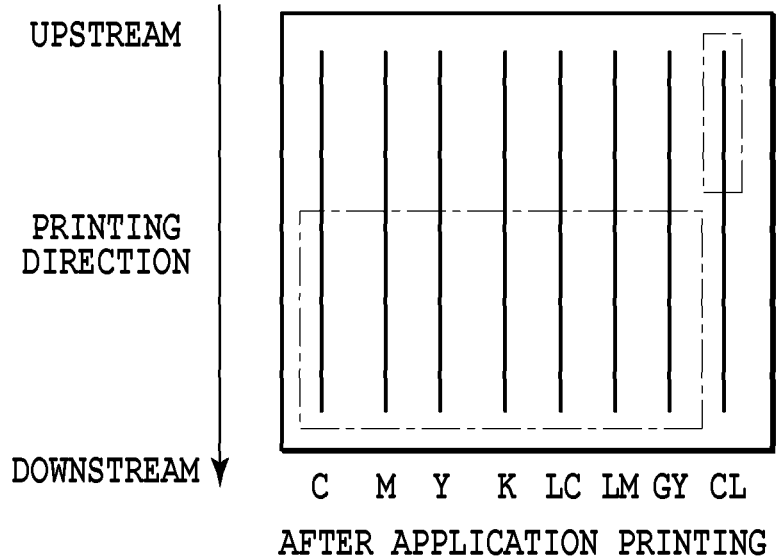
FIGS. 19A and 19B are diagrams illustrating the positions of nozzles in use on a print head when conducting common printing and after application printing.
Figure 19B:
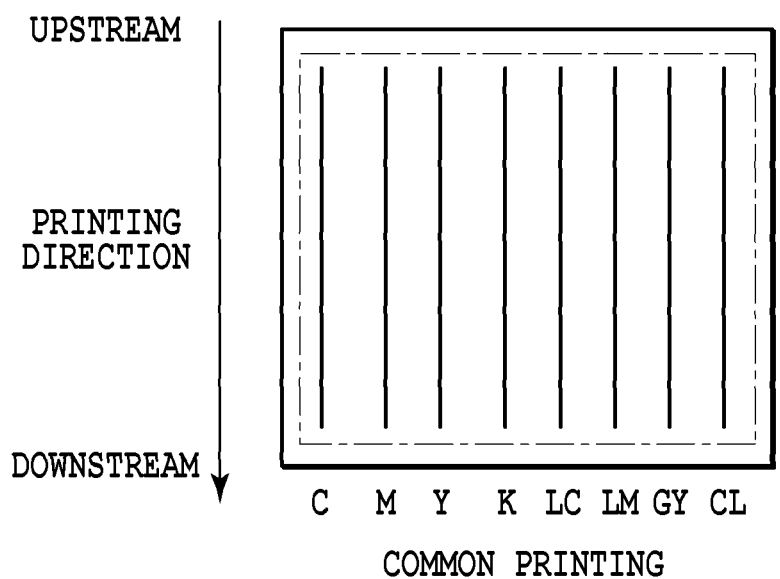

FIGS. 19A and 19B are diagrams illustrating ranges of nozzles in use on a print head when performing after application printing and common printing. In FIGS. 19A and 19B, the regions enclosed by broken lines indicate the nozzle ranges used by the respective printing methods. As illustrated in FIG. 19B, with common printing, the nozzle range for the colored ink C, M, Y, K, LC, LM, and GY as well as the nozzle range for the image quality improving liquid CL use nozzles in the same range in the printing direction. Meanwhile, the nozzle range used for colored ink in after application printing uses a nozzle range that is downstream in the printing direction, or in other words a nozzle range that prints earlier onto a given print area on the print medium, whereas the image quality improving liquid uses a nozzle range that is upstream in the printing direction, or in other words a nozzle range on the side that prints later.

Figure 20A:
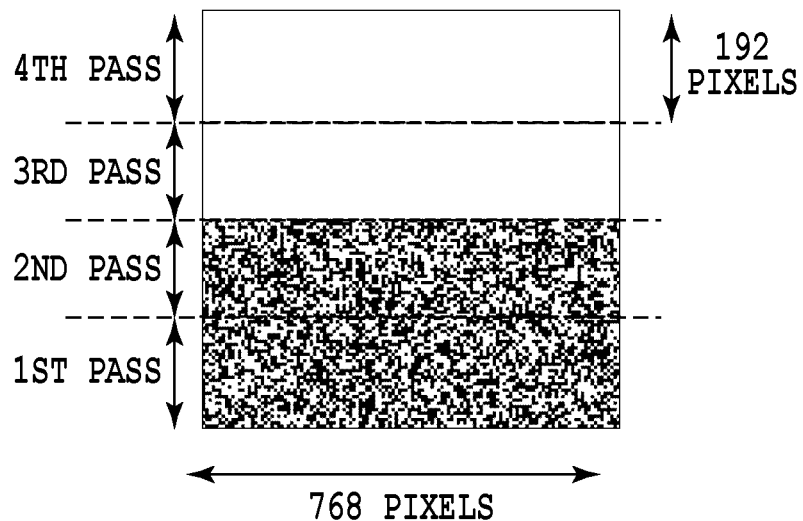
FIGS. 20A and 20B are diagrams illustrating mask patterns for individual ink colors used in the first embodiment of the present invention.
Figure 20B:
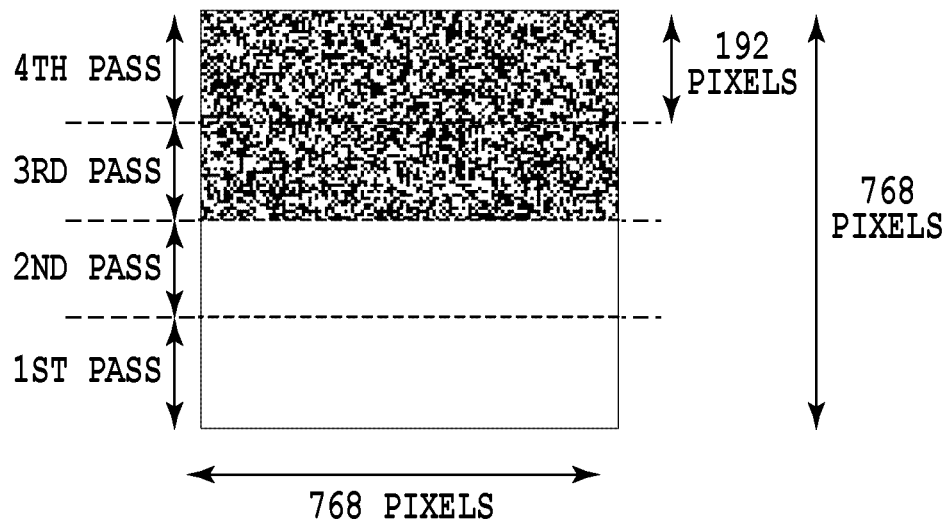

The method of implementing the after application printing may involve using different nozzle positions as in FIG. 19A by using different mask patterns discussed earlier for the colored ink and the image quality improving liquid. FIGS. 20A and 20B are diagrams illustrating examples of mask patterns for the after application printing. FIG. 20A illustrates a mask pattern for colored ink, while FIG. 20B illustrates a mask pattern for image quality improving liquid. More specifically, in the present embodiment, with 4-pass multi-pass printing in which the printing of a unit area of a print medium is completed in four passes, the printing of colored ink is completed in two passes: the first pass and the second pass. Accordingly, the divided mask areas corresponding to the above first pass and second pass in the mask pattern exist in a mutually complementary relationship, as illustrated in FIG. 20A. Meanwhile, printing of image quality improving liquid onto the unit area is completed in two passes: the third pass and the fourth pass. Accordingly, the divided mask areas corresponding to the above third pass and fourth pass in the mask pattern exist in a mutually complementary relationship, as illustrated in FIG. 20B. In this way, the image quality improving liquid is printed during later scans (passes; the third pass and the fourth pass) than the colored ink (the after application printing).

(Color Mode and Monochrome Mode Color Conversion Processes, and Specular Light Color Change/Image Clarity Properties)

An inkjet printing apparatus according to an embodiment of the present invention is able to execute a color mode and a monochrome mode, with colored ink and image quality improving liquid being used differently according to these multiple printing modes.

Figure 21A:
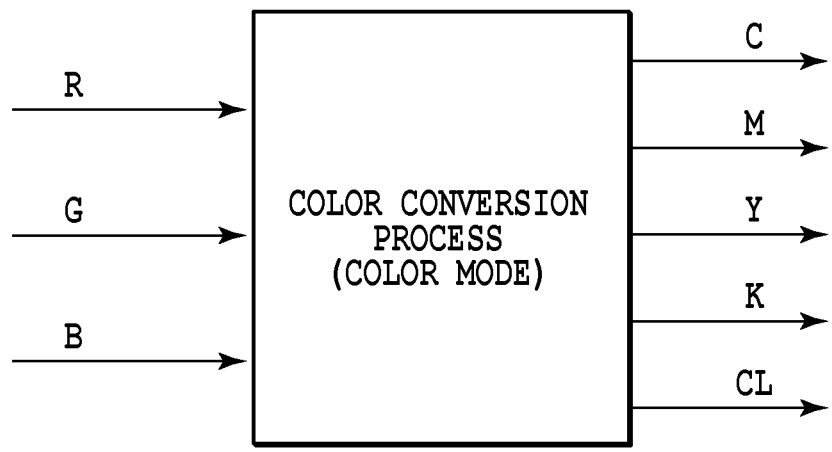
FIGS. 21A and 21B are diagrams illustrating the configuration of a color mode and a monochrome mode color conversion process.
Figure 21B:
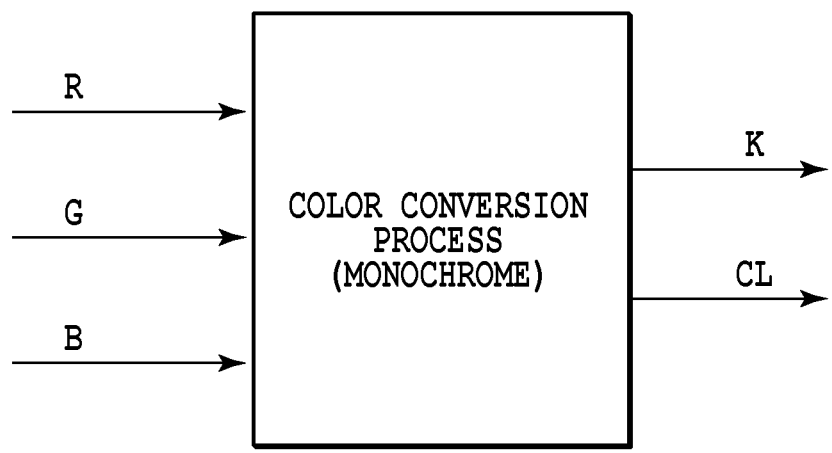

FIGS. 21A and 21B are block diagrams illustrating color conversion processes by the color converting section 903 (FIG. 11) in the color mode and monochrome mode, respectively. Note that for the sake of simplicity in the drawings and description, an example of using only achromatic ink K in monochrome mode and the chromatic inks C, M, and Y in addition to K in the color mode for the colored ink is illustrated. As illustrated in FIGS. 21A and 21B, the color converting section 903 outputs image quality improving liquid CL together with the above colored ink for color mode and monochrome mode, respectively.

Figure 22A:
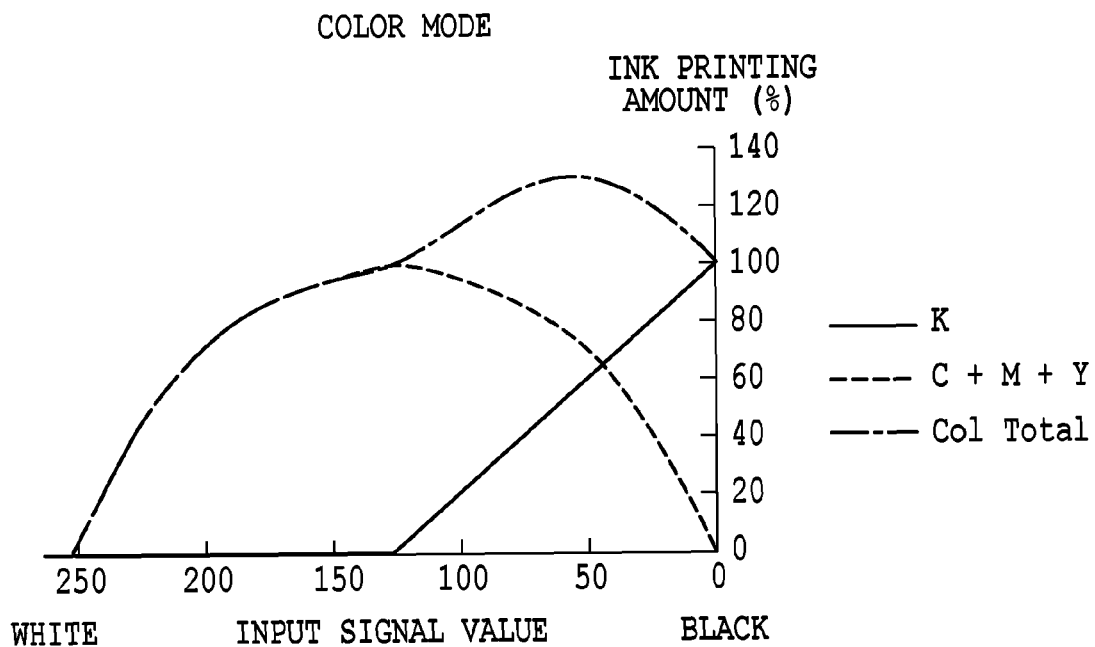
FIGS. 22A and 22B are diagrams illustrating the relationship between color mode and monochrome mode ink printing amounts in the case of a gray line.
Figure 22B:
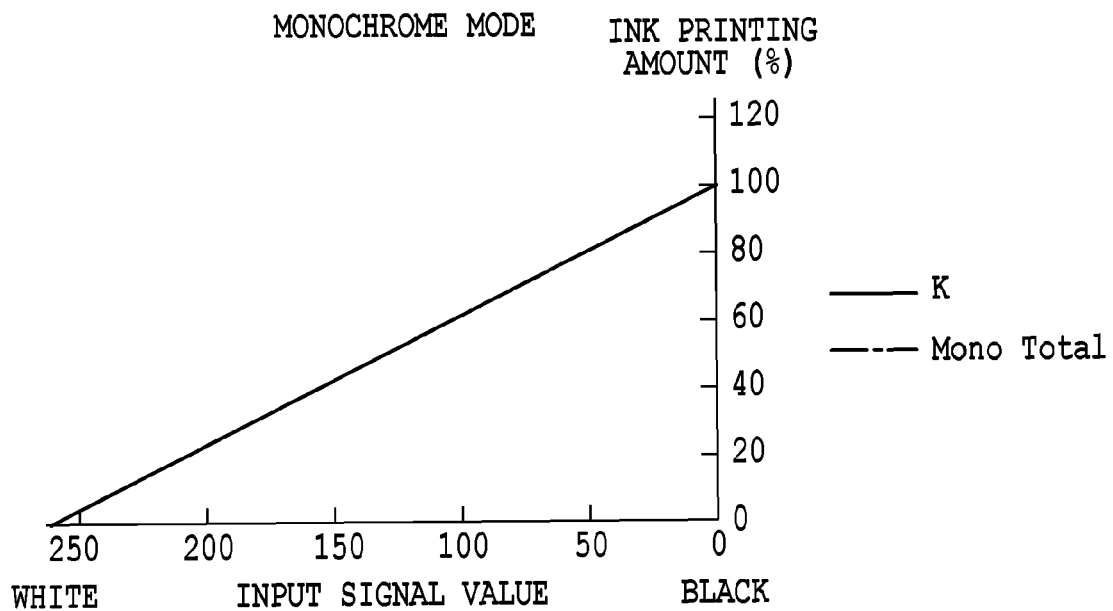

In color mode, there are more types of ink in use and greater total ink printing amounts compared to monochrome mode. FIGS. 22A and 22B are diagrams illustrating ink printing amounts colored ink on a gray line in the color mode and the monochrome mode, respectively. As illustrated in FIGS. 22A and 22B, color mode uses more types of ink and greater total ink printing amounts than monochrome mode over all gradations.

Figure 23A:
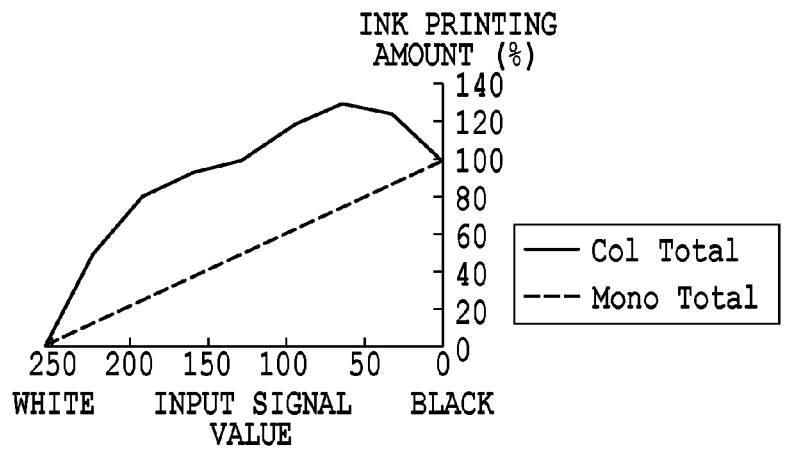
FIGS. 23A to 23E are diagrams illustrating the saturation and image clarity of reflected light in color mode and monochrome mode.
Figure 23B:
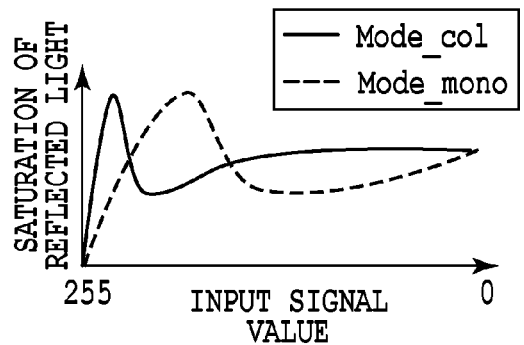
Figure 23D:
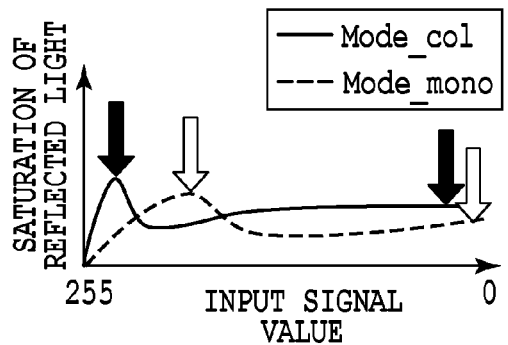
Figure 23C:
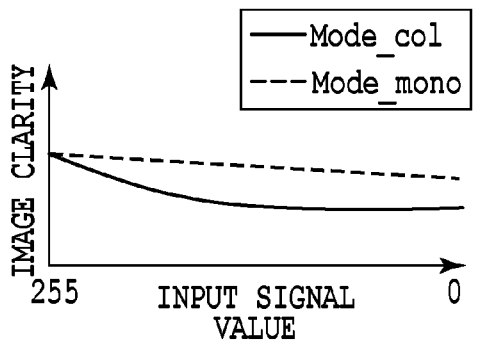

FIGS. 23B and 23C are diagrams illustrating the respective chroma (color change) in reflected light and the image clarity in the color mode and the monochrome mode when given the ink usage rates illustrated in FIGS. 22A and 22B (the total ink printing amounts are illustrated in FIG. 23A). In color mode, irregularities at the print surface tend to become larger and image clarity tends to decrease in a print area with many types and large quantities of colored ink in use, and in addition, color change in specular light due to bronzing also becomes significant in portions with high ink printing amounts, and is noticeable over a wide range from the intermediate gradations to the dark portion. Meanwhile, in monochrome mode, since there are few types and small quantities of colored ink in use, image clarity is generally high, and color change due to thin-film interference tends to become significant from highlight to intermediate colors.

Thus, in the present embodiment, the method for printing image quality improving liquid in varied between color mode and monochrome mode, while the usage rates for image quality improving liquid are also changed for each tone. Hereinafter, printing methods and image quality improving liquid usage rates according to the present embodiment will be described.

First, the respective printing methods for the image quality improving liquid CL in color mode and monochrome mode will be described. As discussed above, in color mode, irregularities at the print surface tend to become larger and image clarity tends to decrease in a print area with many types and large quantities of colored ink in use, and in addition, color change in specular light due to bronzing also becomes significant in areas with high ink printing amounts, and is noticeable over a wide range from the intermediate gradations to the dark portion. For this reason, the image quality improving liquid used in color mode is printed by the after application printing, which does not readily decrease image clarity and which has a high bronze suppressing effect. On the other hand, in monochrome mode, since there are few types and small quantities of colored ink in use, image clarity is generally high, and color change due to thin-film interference tends to become significant from the highlight portion to the intermediate gradation portion. For this reason, the image quality improving liquid used in monochrome mode is printed by the common printing, which roughens the shape of the surface and which has a high thin-film interference suppressing effect.

Next, a configuration for determining image quality improving liquid CL rates in color mode and monochrome mode will be described.

Figure 24A:
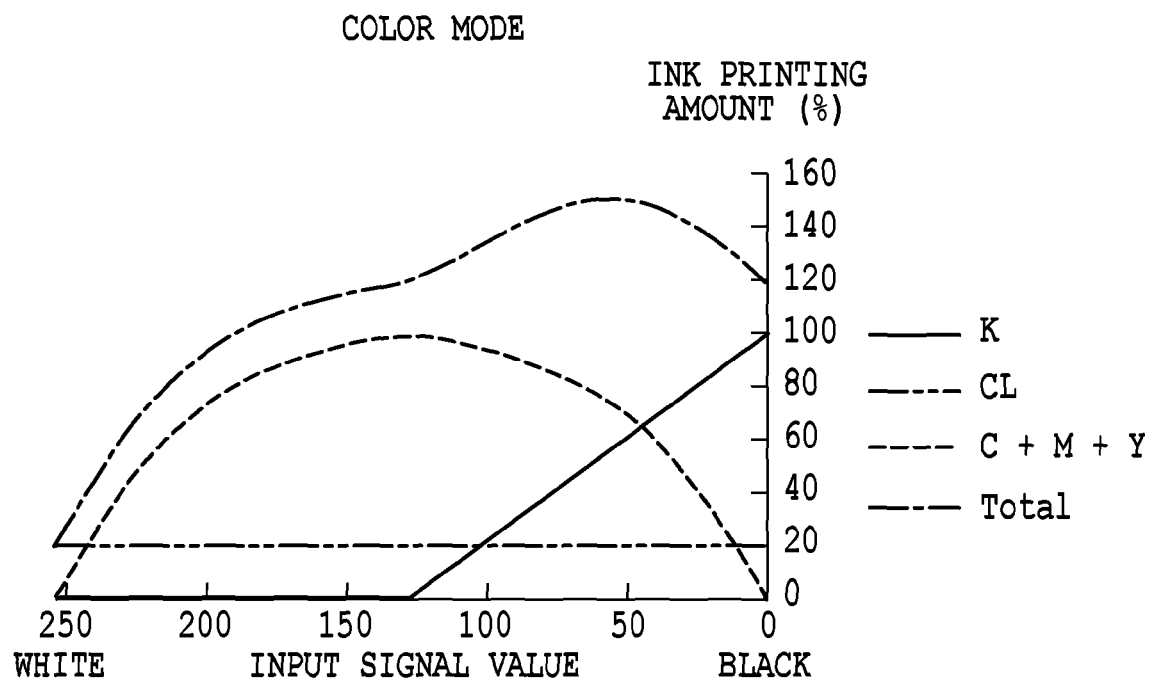
FIGS. 24A and 24B are diagrams illustrating the amount of image quality improving liquid CL versus the input signal value in color mode and monochrome mode.
Figure 24B:
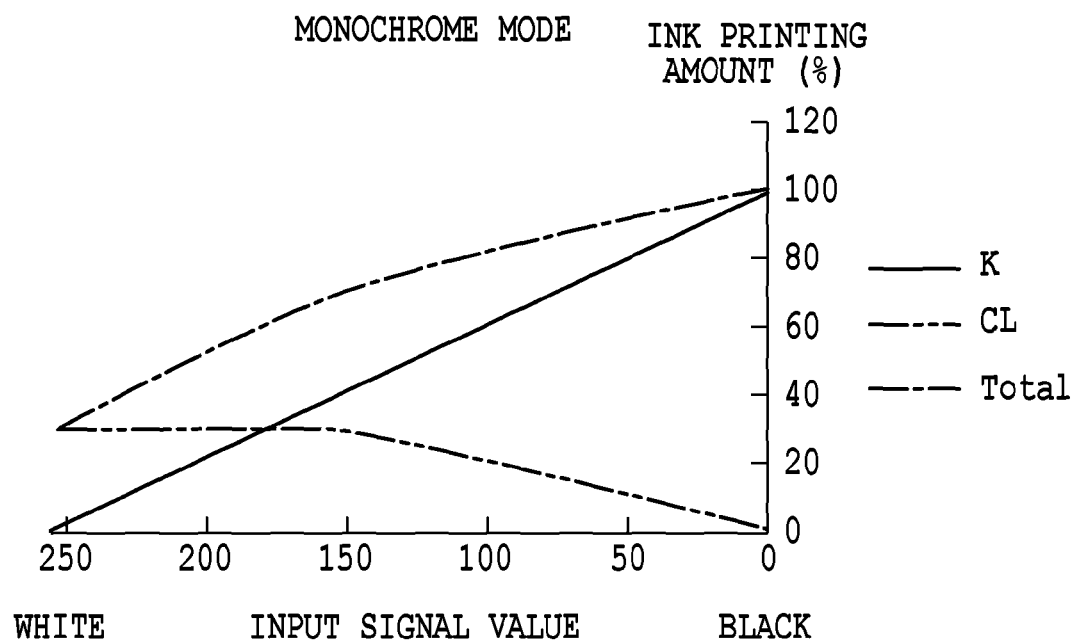

FIGS. 24A and 24B are diagrams illustrating the contents of color conversion tables used by the color converting section 903 illustrated in FIGS. 21A and 21B, and illustrate total ink printing amounts (usage amounts) of colored ink and image quality improving liquid with respect to input signal values (R, G, B). In color mode, the image quality improving liquid is set to the same amount of 20% for all input signal values, as illustrated in FIG. 24A. Meanwhile, in monochrome mode, the image quality improving liquid is set to an amount of 30% in the highlight portion, and the ink printing amount gradually decreases starting from the intermediate gradations and proceeding towards the high-density region, as illustrated in FIG. 24B. To summarize, for color mode and monochrome mode, the image quality improving liquid usage amount in color mode is equal for all gradations, whereas the image quality improving liquid usage amount in monochrome mode is equal in a low-density portion, and decreases in portions closer to the high-density side from that low-density portion.

Figure 23E:
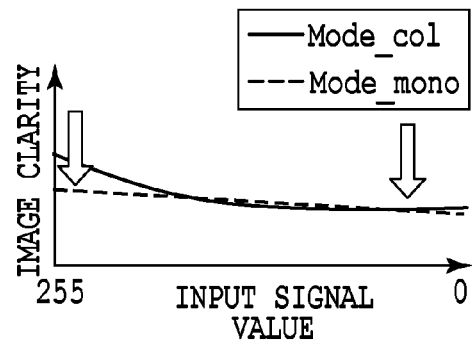

FIGS. 23D and 23E illustrate how the saturation of reflected light and image clarity change in color mode and monochrome mode by setting the ink and image quality improving liquid usage amounts illustrated in FIGS. 24A and 24B.

In monochrome mode, there is significant color change in the specular light due to thin-film interference on the highlight side compared to color mode, and thus the common printing is adopted as the printing method as discussed earlier. In other words, by printing the image quality improving liquid and the colored ink at nearly the same timings, the shape of the surface is roughened to suppress thin-film interference, and thus the image quality improving liquid has a greater use amount compared to the color mode. On the other hand, in the portions of intermediate gradations and above in monochrome mode, the color change in specular light is small compared to the color mode, and the ink printing amounts increase for gradations at intermediate gradations and above the intermediate tones. For this reason, since using a large amount of image quality improving liquid in the common printing significantly lowers image clarity, the image quality improving liquid usage amount is kept lower compared to the color mode.

As described above, by adjusting the optimal printing method and usage amount for image quality improving liquid in accordance with the image quality characteristics of color mode and monochrome mode, it is possible to decrease color change in specular light while maintaining at least a certain level of image clarity in both modes. In so doing, it is possible to print favorable images of both color photos and monochrome photos.

Second Embodiment

The second embodiment of the present invention relates to a procedure that determines the printing method and amount for image quality improving liquid according to a printing mode corresponding to the type of paper (print medium) used for printing.

Inkjet printing papers include glossy paper, which has a smooth surface and excellent glossiness, and semi-glossy paper, in which the surface is given slight irregularities to reduce gloss and produce a texture close to the matte of silver halide photographs. Such semi-glossy paper has irregularities with an Ra value (a parameter expressing surface roughness) of approximately 0.6 μm. Thus, light incident on the print surface is easily scattered, reducing the gloss and image clarity. In addition, bronzing and thin-film interference do not readily occur as a consequence.

Herein, with glossy paper, color change in specular light due to bronzing becomes significant in portions with large ink printing amounts, and is noticeable over a wide range from the intermediate gradations to the dark portion. For this reason, the printing method for image quality improving liquid used in color mode uses the after application printing, which does not readily decrease image clarity and which has a high bronze-suppressing effect. On the other hand, with semi-glossy paper, there is little color change in specular light due to bronzing and the color change in specular light is still suppressed to a certain degree even without suppressing bronzing with image quality improving liquid. Furthermore, since the after application printing prints with fewer nozzles as illustrated in FIG. 19A, the printing speed drops. For these reasons, with semi-glossy paper, the after application printing is not used, and image quality improving liquid is printed by the common printing.

Figure 25A:
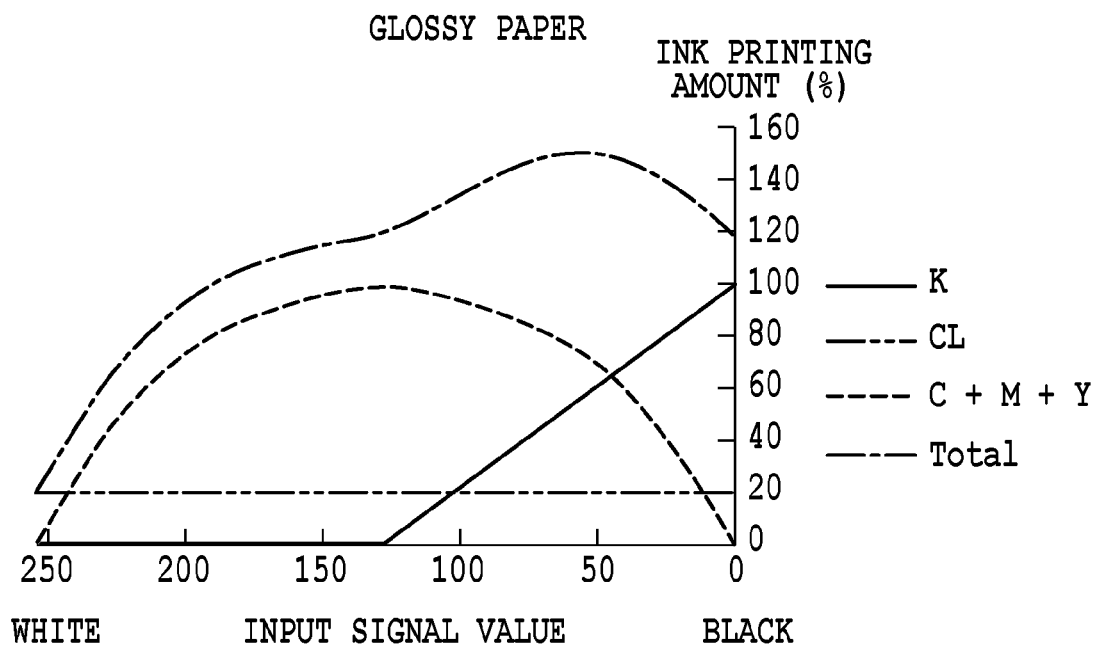
FIGS. 25A and 25B are diagrams illustrating image quality improving liquid usage rates in the second embodiment of the present invention.
Figure 25B:
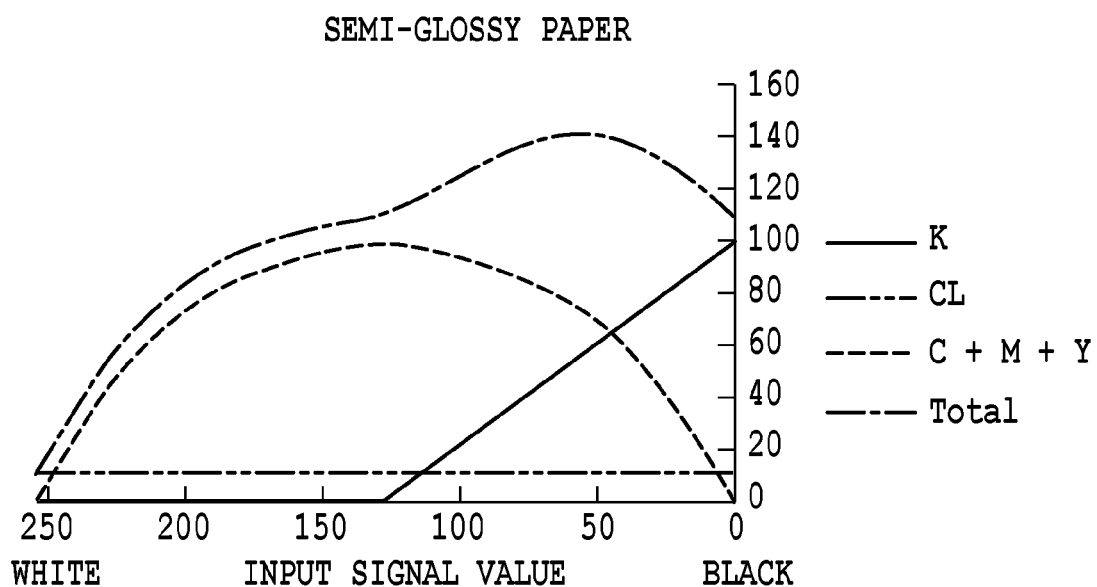

The image quality improving liquid usage amounts are as follows. FIGS. 25A and 25B are diagrams illustrating the contents of color conversion tables of the present embodiment used by the color converting section (903), similarly to FIGS. 24A and 24B. Specifically, FIGS. 25A and 25B illustrate color conversion tables respectively used in the case of glossy paper and semi-glossy paper, and illustrate examples of ink printing amounts (usage amounts) with respect to a gray line in color mode. As illustrated in FIG. 25A, the usage amount of the image quality improving liquid CL for glossy paper is the same as the table illustrated in FIG. 24A according to the first embodiment, with the image quality improving liquid usage amount set to a uniform duty of 20% for all gradations. In contrast, with semi-glossy paper, since bronzing and interference colors are less noticeable, the usage amount of the image quality improving liquid CL is reduced to a uniform duty of 10%. To summarize, for a printing mode that uses a printing paper with a relatively high gloss and a printing mode that uses a printing paper with a relatively low gloss, the image quality improving liquid usage amount is equal for all gradations in the printing mode that uses a printing paper with a relatively high gloss, and the image quality improving liquid usage amount is equal for all gradations in the printing mode that uses a printing paper with a relatively low gloss.

According to the embodiment described above, the printing method and amount of image quality improving liquid is changed according to the type of printing paper, specifically the surface smoothness thereof. In so doing, it is possible to optimally print images and obtain optimal image quality without lowering the printing speed more than necessary, and also without consuming more image quality improving liquid than is necessary.

Third Embodiment

The third embodiment of the present invention relates to a procedure that determines the printing method and amount for image quality improving liquid according to the number of passes in multi-pass printing.

With pigment printing, it is widely known that glossiness changes depending on the number of passes. Japanese Patent Publication No. 4040417 states that gloss level and haze change according to the number of printing passes, with gloss level being higher for fewer printing passes. This is because with fewer printing passes, there is a higher density of dots printed in a single scan, and the interaction of neighboring dots during the process of the ink droplets permeating through the printing sheet surface after landing causes the dots to join together during permeation. As a result, surface irregularities are less likely to form. On the other hand, in the case of many printing passes, there is a low density of dots printed in a single scan, and there is less interaction between neighboring dots during the process of the ink droplets permeating through the printing sheet surface after landing. Thus, the boundary of pigment material from a single dot after permeation still remains, and surface irregularities are more likely to form.

Given the above points, in printing modes with a large number of passes (eight passes or more, for example), the printing method for image quality improving liquid uses the after application printing, which is less likely to lower image clarity. Meanwhile, in printing modes with a small number of passes (less than eight passes, for example), the printing method for image quality improving liquid uses the common printing in order to suppress thin-film interference, which readily occurs due to the high image clarity.

Figure 26A:
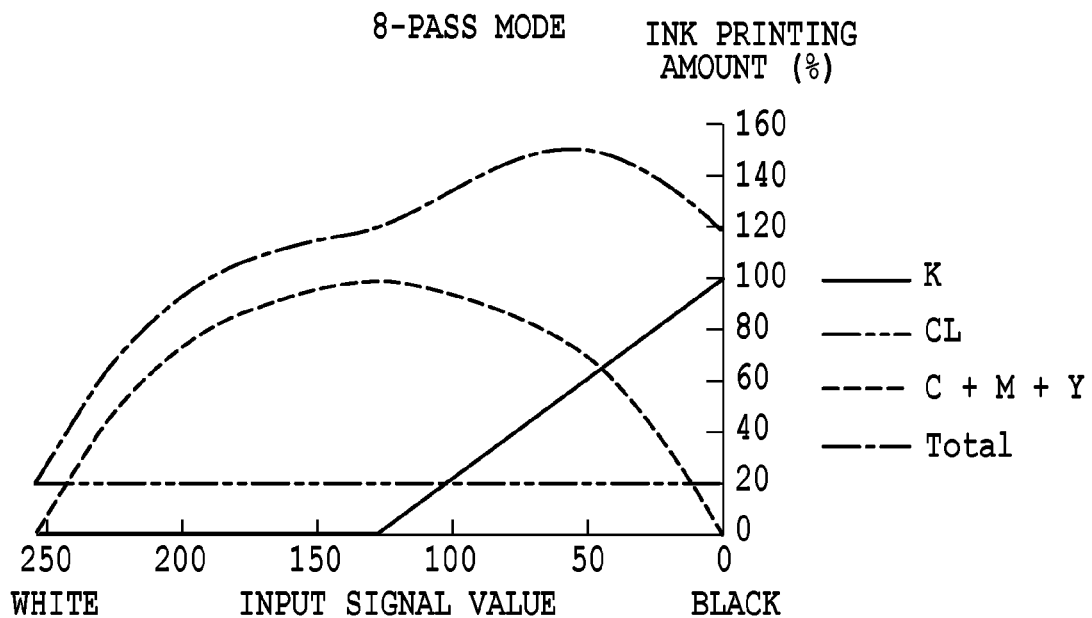
FIGS. 26A and 26B are diagrams illustrating image quality improving liquid usage rates in the third embodiment of the present invention.
Figure 26B:
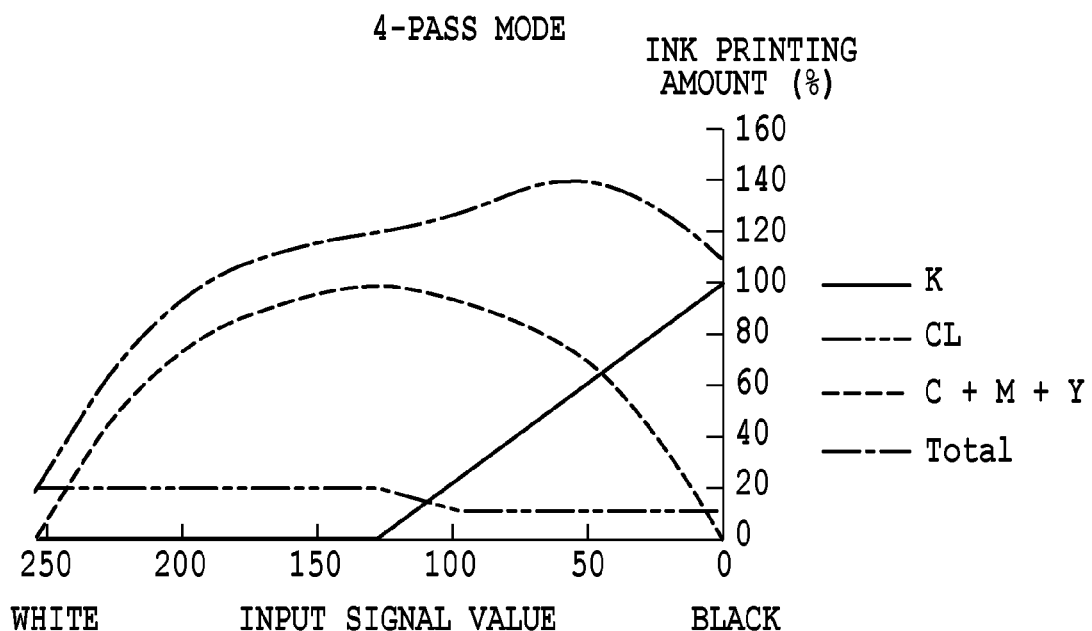

The image quality improving liquid usage amounts are as follows. FIGS. 26A and 26B are diagrams illustrating the contents of color conversion tables of the present embodiment used by the color converting section (903). Specifically, FIGS. 26A and 26B illustrate color conversion tables respectively used in the case of 8-pass and 4-pass modes, and illustrate examples of ink printing amounts (usage amounts) with respect to a gray line in color mode.

As illustrated in FIG. 26A, the usage amount of the image quality improving liquid CL for 8-pass mode is the same as in the first embodiment, with the usage amount set to a uniform duty of 20% for all gradations. In contrast, in 4-pass mode, since interference color due to thin-film interference is less noticeable in the highlight portion, the common printing is used together with an image quality improving liquid usage amount set to the same uniform duty of 20% as with 8-pass printing. Meanwhile, since changes in image clarity due to the common printing readily occur in the portions extending from the intermediate gradations to the dark portion, the usage amount is set to a 10% duty, lower than in 8-pass mode printing. To summarize, for printing modes that scan over a unit area a different number of times in multi-pass printing, the image quality improving liquid usage amount is equal for all gradations in a printing mode with a relatively high number of scans, whereas in a printing mode with a relatively low number of scans, the image quality improving liquid usage amount is equal in a low-density portion, decreases in a portion closer to the high-density portion from that low-density portion, and is thereafter equal.

As described above, according to the present embodiment, by changing the printing method and amount for image quality improving liquid according to the change in the shape of the surface caused by the number of printing passes, it is possible to optimally print images.

Other Embodiments

Although the foregoing embodiments describe a configuration in which the image quality improving liquid in use contains resin solutions exhibiting two different types of properties, the configuration is not limited thereto. For example, resin solutions that exhibit three or more different types of properties may be used for the image quality improving liquid. In other words, the present invention can be applied to a configuration that uses resin solutions exhibiting two or more different types of properties.

Also, although the foregoing embodiments set the printing method and rate for image quality improving liquid according to the printing mode, it is also possible to differentiate only one of either the printing method or the rate for image quality improving liquid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106989, filed May 8, 2012, which is hereby incorporated by reference herein in its entirety.

What is claimed is:

1. An image processing apparatus that generates print data for performing printing by using a print unit that is provided with a plurality of nozzles for ejecting colored ink and a plurality of nozzles for ejecting image quality improving liquid, the image quality improving liquid including two or more types of resins having different permeability into the print medium, to eject the colored ink and the print quality improving liquid to a print medium conveyed in a predetermined direction, said apparatus comprising:
   a converting unit configured to convert image data into use amount data of the colored ink and the print quality improving liquid; and
   a print data generating unit configured to generate print data for each of a plurality of print modes, based on the use amount data, wherein
   said converting unit performs conversions that differ in a use amount of the print quality improving liquid from one print mode to another, and
   said print data generating unit generates print data for executing a printing procedure that uses the nozzles of colored ink and the nozzles of image quality improving liquid, the nozzles of the colored ink and the nozzles of the image quality improving liquid having the same range as each other in the predetermined direction so that the printing procedure starts printing with the image quality improving liquid before completing printing with colored ink or a printing procedure that uses a part of the nozzles of colored ink and a part of the nozzles of image quality improving liquid, the part of the nozzles of the colored ink being located downstream in the predetermined direction and the part of the nozzles of the image quality improving liquid being located upstream in the predetermined direction so that the printing procedure starts printing with the image quality improving liquid after completing printing with colored ink, for each of the plurality of print modes.

2. The image processing apparatus as claimed in claim 1, wherein said print data generating unit differentiates mask patterns used for performing printing for a unit area with a plurality of scans by the print head to the unit area so as to generate print data for executing the printing procedure which starts printing with the image quality improving liquid before completing printing with colored ink or the printing procedure which starts printing with the image quality improving liquid after completing printing with colored ink.

3. The image processing apparatus as claimed in claim 2, wherein the plurality of print modes are print modes differing in the number of scans to the unit area for completing printing, the use amounts of the print quality improving liquid for a print mode in which the number of scans is relatively large are substantially equivalent over all gradations, and the use amounts of the print quality improving liquid for a print mode in which the number of scans is relatively small are substantially equivalent in low density portion, decrease in a portion having higher density than that of the low density portion, and are substantially equivalent at a portion above the portion having higher density.

4. The image processing apparatus as claimed in claim 1, wherein the plurality of print modes include a print mode that uses a print medium having relatively high gloss level and a print mode that uses a print medium having relatively low gloss level, the use amounts of the print quality improving liquid for the print mode that uses a print medium having relatively high gloss level are substantially equivalent over all gradations, and the use amounts of the print quality improving liquid for the print mode that uses a print medium having relatively low gloss level are substantially equivalent over all gradations.

5. The image processing apparatus as claimed in claim 1, wherein the plurality of print modes include a monochrome mode and a color mode, the monochrome mode that is performed by using the colored inks including a black ink and the image quality improving liquid, and the color mode that is performed by using the colored inks including greater number of colored inks than the monochrome mode and the image quality improving liquid.

6. The image processing apparatus as claimed in claim 5, wherein the use amounts of the print quality improving liquid for the color mode are substantially equivalent over all gradations, and the use amounts of the print quality improving liquid for the monochrome mode are substantially equivalent in low density portion and decrease in a portion having higher density than that of the low density portion.

7. An ink jet printing apparatus that performs printing by using a print unit that is provided with a plurality of nozzles for ejecting colored ink and a plurality of nozzles for ejecting image quality improving liquid, the image quality improving liquid including two or more types of resins having different permeability into a print medium, to eject the colored ink and the print quality improving liquid to a print medium conveyed in a predetermined direction, said apparatus comprising:
   a converting unit configured to convert image data into use amount data of the colored ink and the print quality improving liquid;
   a print data generating unit configured to generate print data for each of a plurality of print modes, based on the use amount data; and
   a printing unit configured to perform printing onto the print medium based on the print data generated by said print data generating unit, wherein
   said converting unit performs conversions that differ in a use amount of the print quality improving liquid from one print mode to another, and
   said print data generating unit generates print data for executing a printing procedure that uses the nozzles of colored ink and the nozzles of image quality improving liquid, the nozzles of the colored ink and the nozzles of the image quality improving liquid having the same range as each other in the predetermined direction so that the printing procedure starts printing with the image quality improving liquid before completing printing with colored ink or a printing procedure that uses a part of the nozzles of colored ink and a part of the nozzles of image quality improving liquid, the part of the nozzles of the colored ink being located downstream in the predetermined direction and the part of the nozzles of the image quality improving liquid being located upstream in the predetermined direction so that the printing procedure starts printing with the image quality improving liquid after completing printing with colored ink, for each of the plurality of print modes.

8. The ink jet printing apparatus as claimed in claim 7, wherein said print data generating unit differentiates mask patterns used for performing printing for a unit area with a plurality of scans by the print head to the unit area so as to generate print data for executing the printing procedure which starts printing with the image quality improving liquid before completing printing with colored ink or the printing procedure which starts printing with the image quality improving liquid after completing printing with colored ink.

9. The ink jet printing apparatus as claimed in claim 8, wherein the plurality of print modes are print modes differing in the number of scans to the unit area for completing printing, the use amounts of the print quality improving liquid for a print mode in which the number of scans is relatively large are substantially equivalent over all gradations, and the use amounts of the print quality improving liquid for a print mode in which the number of scans is relatively small are substantially equivalent in low density portion, decrease in a portion having higher density than that of the low density portion, and are substantially equivalent at a portion above the portion having higher density.

10. The ink jet printing apparatus as claimed in claim 7, wherein the plurality of print modes include a print mode that uses a print medium having relatively high gloss level and a print mode that uses a print medium having relatively low gloss level, the use amounts of the print quality improving liquid for the print mode that uses a print medium having relatively high gloss level are substantially equivalent over all gradations, and the use amounts of the print quality improving liquid for the print mode that uses a print medium having relatively low gloss level are substantially equivalent over all gradations.

11. The ink jet printing apparatus as claimed in claim 7, wherein the plurality of print modes include a monochrome mode and a color mode, the monochrome mode that is performed by using the colored inks including a black ink and the image quality improving liquid, and the color mode that is performed by using the colored inks including greater number of colored inks than the monochrome mode and the image quality improving liquid.

12. The ink jet printing apparatus as claimed in claim 11, wherein the use amounts of the print quality improving liquid for the color mode are substantially equivalent over all gradations, and the use amounts of the print quality improving liquid for the monochrome mode are substantially equivalent in low density portion and decrease in a portion having higher density than that of the low density portion.

13. An ink jet printing method of performing printing by using a print unit that is provided with a plurality of nozzles for ejecting colored ink and a plurality of nozzles for ejecting image quality improving liquid, the image quality improving liquid including two or more types of resins having different permeability into a print medium, to eject the colored ink and the print quality improving liquid to a print medium conveyed in a predetermined direction, said method comprising:
   a converting step of converting image data into use amount data of the colored ink and the print quality improving liquid;
   a print data generating step of generating print data for each of a plurality of print modes, based on the use amount data; and
   a printing step of performing printing onto the print medium based on the print data generated by said print data generating step, wherein
   said converting step performs conversions that differ in a use amount of the print quality improving liquid from one print mode to another, and
   said print data generating step generates print data for executing a printing procedure that uses the nozzles of colored ink and the nozzles of image quality improving liquid, the nozzles of the colored ink and the nozzles of the image quality improving liquid having the same range as each other in the predetermined direction so that the printing procedure starts printing with the image quality improving liquid before completing printing with colored ink or a printing procedure that uses a part of the nozzles of colored ink and a part of the nozzles of image quality improving liquid, the part of the nozzles of the colored ink being located downstream in the predetermined direction and the part of the nozzles of the image quality improving liquid being located upstream in the predetermined direction so that the printing procedure starts printing with the image quality improving liquid after completing printing with colored ink, for each of the plurality of print modes.

* * * * *